(12) United States Patent
Barron et al.

(10) Patent No.: US 7,641,208 B1
(45) Date of Patent: Jan. 5, 2010

(54) VEHICLE ROLL CONTROL SYSTEM WITH SELF-CENTERING ACTUATOR

(75) Inventors: Richard J. Barron, Ann Arbor, MI (US); Blaise Ganzel, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 679 days.

(21) Appl. No.: 10/892,784

(22) Filed: Jul. 16, 2004

Related U.S. Application Data

(60) Provisional application No. 60/488,103, filed on Jul. 16, 2003.

(51) Int. Cl.
*B60G 21/05* (2006.01)

(52) U.S. Cl. .............................................. 280/124.106

(58) Field of Classification Search .......... 280/124.106, 280/124.107, 124.157, 124.16, 124.161, 280/5.506, 5.508; 188/284, 316, 318, 322.19
See application file for complete search history.

(56) References Cited

U.S. PATENT DOCUMENTS

| | | | |
|---|---|---|---|
| 3,328,019 A | 6/1967 | Wilson | |
| 3,625,540 A * | 12/1971 | Jewell | 280/6.159 |
| 3,752,497 A | 8/1973 | Enke et al. | |
| 3,820,812 A | 6/1974 | Stubbs et al. | |
| 3,868,910 A | 3/1975 | Schultz | |
| 3,868,911 A | 3/1975 | Schultz | |
| 3,871,635 A | 3/1975 | Unruh et al. | |
| 3,885,809 A | 5/1975 | Pitcher | |
| 3,953,040 A | 4/1976 | Unruh et al. | |
| 4,206,935 A | 6/1980 | Sheppard et al. | |
| 4,345,661 A | 8/1982 | Nishikawa | |
| 4,589,678 A | 5/1986 | Lund | |
| 4,624,476 A | 11/1986 | Tanaka et al. | |
| 4,669,749 A | 6/1987 | Tanaka et al. | |
| 4,693,493 A | 9/1987 | Ikemoto et al. | |
| 4,697,237 A | 9/1987 | Tanaka et al. | |
| 4,730,843 A | 3/1988 | Tanaka et al. | |
| 4,765,649 A | 8/1988 | Ikemoto et al. | |
| 4,903,982 A | 2/1990 | Harara et al. | |
| 4,937,748 A | 6/1990 | Yonekawa et al. | |
| 4,966,390 A | 10/1990 | Lund et al. | |
| 4,973,077 A * | 11/1990 | Kuwayama et al. | 280/124.107 |
| 4,974,875 A | 12/1990 | Sugasawa et al. | |
| 5,015,009 A | 5/1991 | Ohyama et al. | |
| 5,020,826 A | 6/1991 | Stecklein et al. | |
| 5,040,823 A | 8/1991 | Lund | |
| 5,066,041 A | 11/1991 | Kindemann et al. | |
| 5,106,120 A | 4/1992 | Di Maria | |
| 5,116,069 A | 5/1992 | Miller | |
| 5,149,131 A | 9/1992 | Sugasawa et al. | |
| 5,161,822 A | 11/1992 | Lund | |
| 5,177,681 A | 1/1993 | Sato | |
| 5,178,406 A | 1/1993 | Reynolds | |
| 5,195,772 A | 3/1993 | Bachrach et al. | |
| 5,219,181 A | 6/1993 | Lund | |
| 5,230,529 A | 7/1993 | Harvey-Bailey | |
| 5,251,134 A | 10/1993 | Takehara et al. | |

(Continued)

*Primary Examiner*—Paul N Dickson
*Assistant Examiner*—Robert A Coker
(74) *Attorney, Agent, or Firm*—MacMillan, Sobanski & Todd, LLC

(57) ABSTRACT

A system is disclosed for controlling the roll of a motor vehicle. The system comprises a selective lock connected between an unsprung portion of the vehicle and a sprung portion of the vehicle.

6 Claims, 11 Drawing Sheets

U.S. PATENT DOCUMENTS

| | | |
|---|---|---|
| 5,251,136 A | 10/1993 | Fukuyama et al. |
| 5,253,174 A | 10/1993 | Inagaki et al. |
| 5,328,004 A * | 7/1994 | Fannin et al. ............... 188/318 |
| 5,362,094 A | 11/1994 | Jensen |
| 5,443,283 A | 8/1995 | Hawkins et al. |
| 5,447,332 A | 9/1995 | Heyring |
| 5,529,324 A | 6/1996 | Krawczyk et al. |
| 5,597,180 A | 1/1997 | Ganzel |
| 5,630,623 A | 5/1997 | Ganzel |
| 5,899,472 A * | 5/1999 | Burke et al. .......... 280/124.106 |
| 6,296,235 B1 | 10/2001 | Dalal |

* cited by examiner

VEHICLE ROLL CONTROL SYSTEM WITH SELF-CENTERING ACTUATOR

CROSS-REFERENCE TO RELATED APPLICATIONS

This application claims the benefit of U.S. Provisional Application No. 60/488,103, filed Jul. 16, 2003, the disclosures of which are incorporated herein by reference.

BACKGROUND OF THE INVENTION

This invention relates in general to motor vehicle roll control systems and in particular to a self-centering actuator for a roll control system, and a roll control system including a self-centering actuator.

Suspension systems for a motor vehicle are known which isolate the vehicle load from irregularities in the terrain over which the vehicle travels. A semi-active suspension system, for example, normally includes a spring and a damper connected between the sprung and unsprung portions of the vehicle. Semi-active suspension systems are generally self-contained, and only react to the loads applied to them. In active suspension systems, by contrast, the reactions to the applied loads are positively supplied, typically by electronically controlled hydraulic or pneumatic actuators.

In addition to isolating the sprung portion of the vehicle from the road, it is desirable to stabilize the vehicle and resist the tendency of the sprung portion of the vehicle to tilt or roll relative to its unsprung portion when accelerating, decelerating or cornering at relatively high rates. Therefore, suspension systems have been proposed to maintain the vehicle in an essentially level position, regardless of the source of the force seeking to upset that position. For example, U.S. Pat. No. 5,630,623 to Ganzel, the disclosures of which are incorporated herein by reference, discloses a semi-active system for controlling the roll of a motor vehicle including an actuator connected between an unsprung portion of the vehicle and a sprung portion of the vehicle. The known roll control system of U.S. Pat. No. 5,630,623 not only locks and unlocks the anti-roll bars of the vehicle, but also accommodates the upward or downward deflections of any of the four wheels of the vehicle, regardless of whether the affected wheel is on the inside or outside of the turn, as will be described in more detail below.

Referring now to the drawings, FIGS. 1 and 2 show the prior art semi-active, pumpless system 10 for controlling the roll of a motor vehicle according to U.S. Pat. No. 5,630,623. The system 10 comprises a front hydraulic circuit 11a and a rear hydraulic circuit 11b. The front hydraulic circuit 11a includes a front actuator 12, first and second pressure control or pressure relief valves 14 and 16, and first and second check valves 18 and 20. The rear hydraulic circuit 11b includes a second rear actuator 21 and other components similar to those of the front hydraulic circuit 11a which will be discussed below.

Each of the wheels 22, 24, 26 and 28 of the vehicle is rotationally mounted about a substantially horizontal axis to a member such as suspension arms 30, 32, 34 and 36, respectively, which form part of an unsprung portion of the vehicle. The unsprung portion of the vehicle is in turn connected to a sprung portion of the vehicle through the actuators 12 and 21 and anti-roll or anti-sway bars 38 and 40.

Each of the actuators 12 and 21 includes a cylinder 42 and a piston 44 reciprocably disposed in the respective cylinder 42. One of the cylinder 42 or the piston 44 of each actuator 12, 21 is drivingly connected to an associated one of the anti-roll bar 38, 40 or the suspension arm 30, 32, 43, 36 while the other component of each cylinder/piston pair is drivingly connected to the associated other of the anti-roll bar 38, 40 or the suspension arm 30, 32, 43, 36. As shown in FIGS. 1 and 2, for example, the cylinder 42 of the front actuator 12 is connected to one free end of the front anti-roll bar 38, while the portion of the piston rod extending generally downwardly from the cylinder is connected to the front right suspension arm 30. Similarly, the rear anti-roll bar 40 is coupled to the cylinder 42 of the right rear actuator 21 while the piston 44 of the actuator 21 is connected to the suspension arm 32.

The actuators 12 and 21 each have a pair of ports, respectively 46, 48 and 50, 52, through which a working medium such as hydraulic fluid may be alternately provided to or evacuated from the ends of the cylinders 42 disposed on either side of the pistons 44 situated therein. As described more fully below, each of the actuators 12 and 21 serves to maintain the sprung height from the road surface of the portion of the vehicle body above its associated wheel.

The first pressure control valve 14 is a proportional relief valve, and is in communication with the first port 46 of the actuator 12 through a hydraulic line 54. The valve 14 is operated by a proportional solenoid, and has an open position and a closed position. In response to actual or anticipated loading of the actuator 12, the solenoid energizes the valve 14 toward the closed position with a force proportional to an electric signal applied thereto, which prevents flow away from the first port 46 until a predetermined pressure develops in the upper chamber of the cylinder 42 to overcome the solenoid force, as described more fully below. The first check valve 18 is situated in the hydraulic circuit in parallel with the first pressure control valve 14, and permits flow therethrough only in a direction toward the first port 46 of the actuator 12.

The second pressure control valve 16 is also a proportional relief valve, and is in communication with the second port 48 of the actuator 12 through a hydraulic line 56. The valve 16 is also controlled by a proportional solenoid, and can be moved between open and closed positions by the solenoid to prevent flow away from the second port 48 until a predetermined pressure develops in the lower chamber of the cylinder 42. The second check valve 20 is situated in the hydraulic circuit in parallel with the second pressure control valve 16 and permits flow therethrough only toward the second port 48 of the actuator 12.

The rear hydraulic circuit 11b for the rear actuator 21 is substantially identical to the hydraulic circuit 1a for the front actuator 12. Thus, a proportional pressure control valve 58 and a parallel check valve 60 are provided in communication with the first port 50 of the rear actuator 21, and another proportional pressure control valve 62 and a parallel check valve 64 are provided in communication with the second port 52 of the rear actuator 21.

In operation, an electronic control unit (ECU) 70, processes inputs from one or more wheel speed sensors 72, a lateral accelerometer 74, and a steering angle sensor 76. Given these inputs, the ECU 70 predicts the severity of an upcoming roll, and issues control commands to the solenoids of the appropriate valves 14 and 58 or 16 and 62. For example, the motor vehicle may begin a relatively high speed left hand turn. Such a turn, in absence of compensation by the system 10, would cause the unsprung portion of the vehicle to tend to roll generally clockwise about it longitudinal axis.

At the beginning of such a maneuver, sensors 72, 74 and 76 signal the instantaneous conditions to the ECU 70. The ECU 70 in turn calculates or obtains from a look up table the net pressure P that needs to be developed in the upper chambers of the cylinders 42 of one or both of the actuators 12 and 21 to counteract the vehicle roll, and energizes the solenoids of the pressure control valves 14 and 58 an amount sufficient to resist flow through those valves up to the pressure P.

To counteract anticipated vehicle roll in the opposite direction, for example as might be experienced during a right hand turn, the ECU 70 repeats this procedure and energizes the solenoids of the valves 16 and 62 to allow build up of the pressure in the lower chambers of both actuator 12 and 21. In either case, as the sensors 72, 74 and 76 indicate an instantaneous or anticipated reduction or increase in the need for counteracting vehicle roll, the ECU 70 signals the appropriate pressure control valves to correspondingly reduce or increase their pressure cut out limit.

If an unexpected load is imposed on one of the actuators, such as might occur when one wheel rolls over a bump in the road, an increased pressure is developed in one chamber of the affected actuator. For example, if the right front wheel 22 encounters a bump and deflects upwardly during a left hand turn, the piston 44 is displaced upwardly in the cylinder 42 and the pressure in the upper chamber of the actuator 12 increases. Even if the valve 14 is energized closed at this time (to resist the anticipated roll), the increased pressure overcomes the solenoid force, allowing the suspension to compress and maintain ride quality. After the wheel 22 then passes over the top of the bump and begins to move downward and the valve 14 closes again, the check valve 18 allows the piston 44 and the suspension arm 30 to fall back down without any resistance from the roll control system. This process takes a finite amount of time, during which the vehicle body will likely roll to the right to some extent, due to the left hand turn. Since fluid was displaced out of the upper chamber of the actuator 12, the piston 44 and the suspension arm 30 are unlikely to return entirely to their original positions by the time pressure in the upper chamber of the actuator 12 returns to it's pre-upset level, and the actuator 12 will remain in a slightly more compressed state than prior to the wheel hitting the bump, allowing more than desired roll to the right during the left hand turn.

Again, considering a left-hand turn, in the event that the left front wheel 28 suddenly rises while the valve 14 is energized closed, the suspension arm 36 moves upwardly and the anti-roll bar 38 above the actuator 12 moves to a new upwardly elevated position relative to the control arm 30, acting to extend in the cylinder 42, and reducing the pressure in the upper chamber of the actuator 12. If the pressure in the upper chamber drops below the pressure in pre-charged accumulator 78, the check valve 18 allows flow into the upper chamber of the actuator 12 so that there is essentially no resistance from the actuator 12 to the extension of the actuator 12. The new extended position may be near the original position or may be beyond, i.e., in a more extended position than the original position, depending on the amount of flow allowed into the upper chamber of the actuator 12.

Again, considering a left-hand turn if the anti-roll bar 38 were originally in a center or neutral position and, for example, the valve 14 is energized with the anti-roll bar 38 out of the original position, when the anti-roll bar 38 is extended into a new position, that new position may be near the original position or past, i.e., past the central or neutral position to a more compressed position than the original position. Thus, it can be said that the actuator 12 can go beyond neutral in both directions, i.e., the actuator 12 can end up in position in which the actuator 12 is either extended more or compressed more than the condition of the actuator 12 at the neutral position.

The accumulator 78 is situated in each of the front and rear hydraulic circuits in communication with the pressure control valves 14, 16 and 58, 62. By maintaining the fluid in the hydraulic circuits under a certain pressure, the accumulator 78 functions to prevent cavitation in the system 10 when the wheels of the vehicle deflect, and also acts as a reservoir to replenish any fluid lost by the system to leakage past dynamic seals. All of the valves and the accumulator for each of the front and rear hydraulic circuits 11a and 11b are packaged in units 80 and 82 mounted near the anti-roll bars 38 and 40. The front and rear hydraulic circuits 11a and 11b are kept separate so that the valves of each circuit can ride with their respective anti-roll bar, which eliminates the need for running expensive flexible hydraulic hoses from the body of the vehicle to the front rear anti-roll bar.

SUMMARY OF THE INVENTION

The present invention includes a hydraulically operated actuator for controlling the roll of a motor vehicle. The actuator is connected between an unsprung portion of the vehicle and a sprung portion of the vehicle for selectively coupling the sprung portion of the vehicle to the unsprung portion of the vehicle. The actuator includes a piston fixed to one of the sprung portion of the vehicle and the unsprung portion of the vehicle and a cylinder fixed to the other of the sprung portion of the vehicle and the unsprung portion of the vehicle. The cylinder has an internal surface defining a bore and at least first and second ports. The piston is disposed in the bore of the cylinder between the first and second ports and sealingly engages the internal surface of the cylinder. The first and second ports are connected by a fluid conduit. A volume of hydraulic fluid is disposed in the bore of the cylinder, such that when flow of the hydraulic fluid between the first port and the second port through the fluid conduit is prevented, the piston can only move in a direction toward a neutral position in the cylinder.

Accordingly, it is an object of the present invention to provide a semi-active roll control system including the actuator described above which allows the vehicle suspension members to return to their neutral position when an unexpected load is imposed on them when the roll control system is functioning.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Preliminarily, it must be noted that directional labels such as upper, lower, top bottom, above, below, over, and under are used with respect to the orientation of the figure under discussion on the page, and are not intended as limitations upon the orientation of the structure of the invention actual use.

Figure 1:
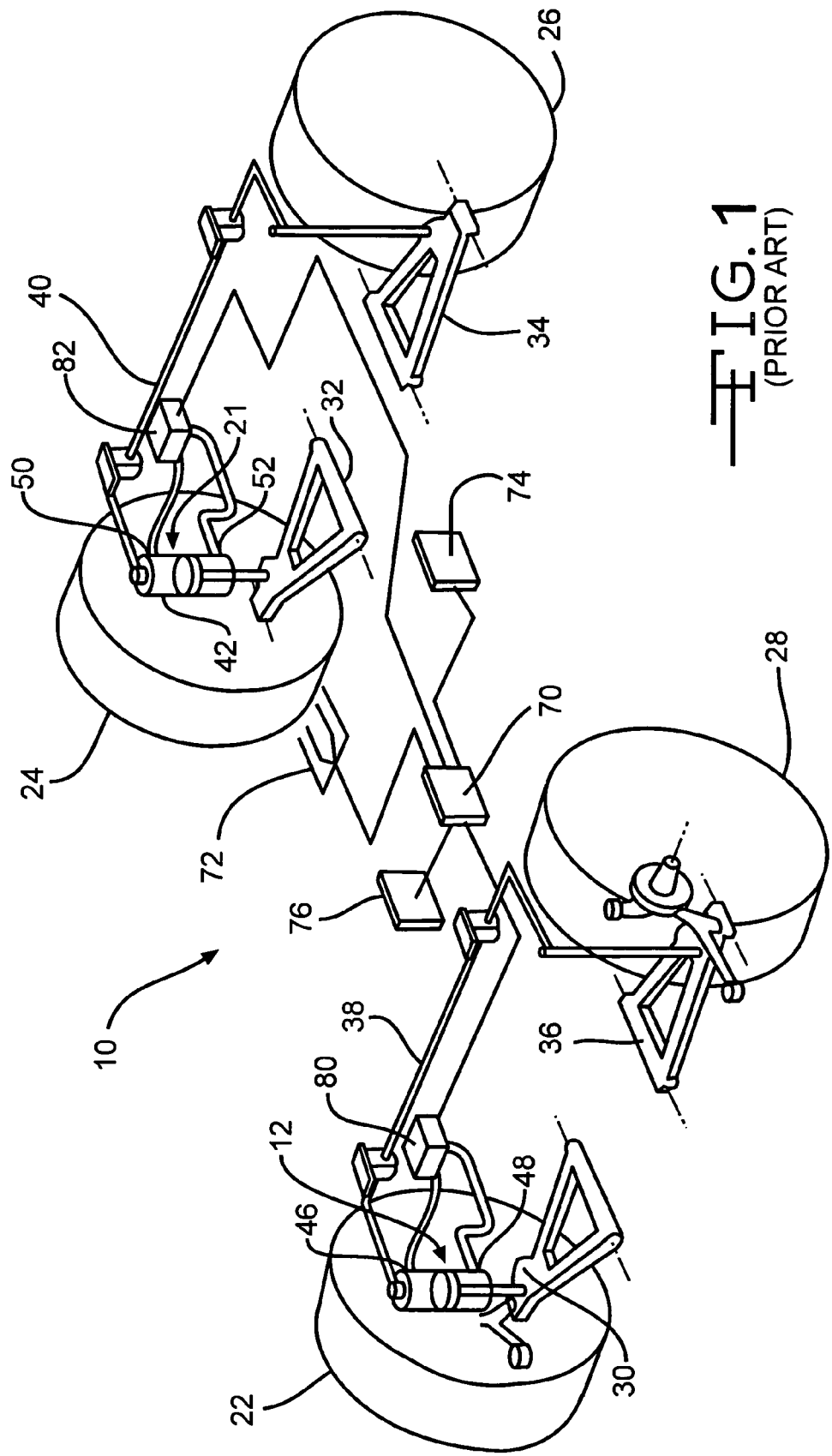
FIG. 1 is a schematic view of a known system for controlling the roll of a motor vehicle.
Figure 2:
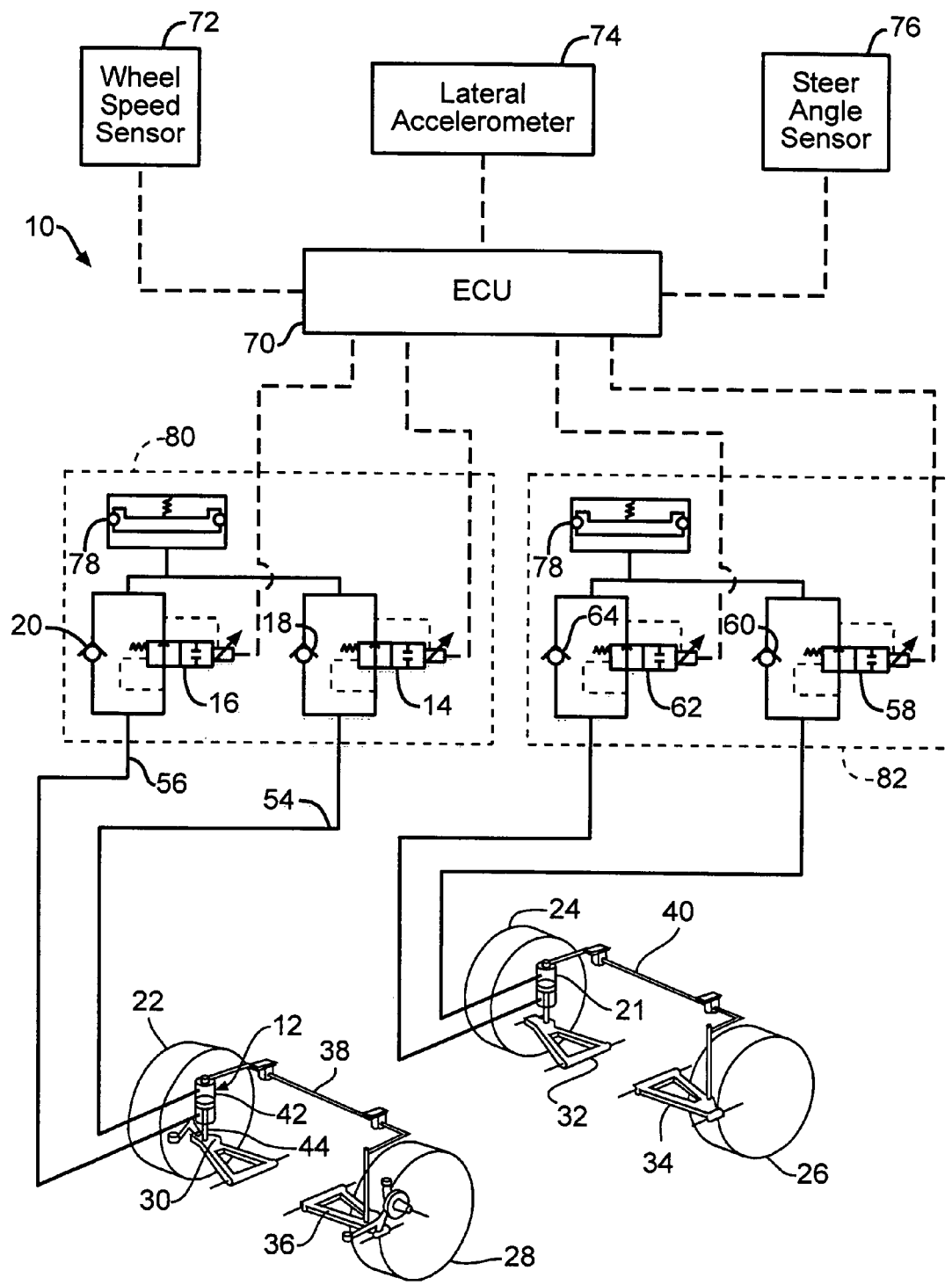
FIG. 2 is another schematic view of the roll control system shown in FIG. 1.
Figure 3:
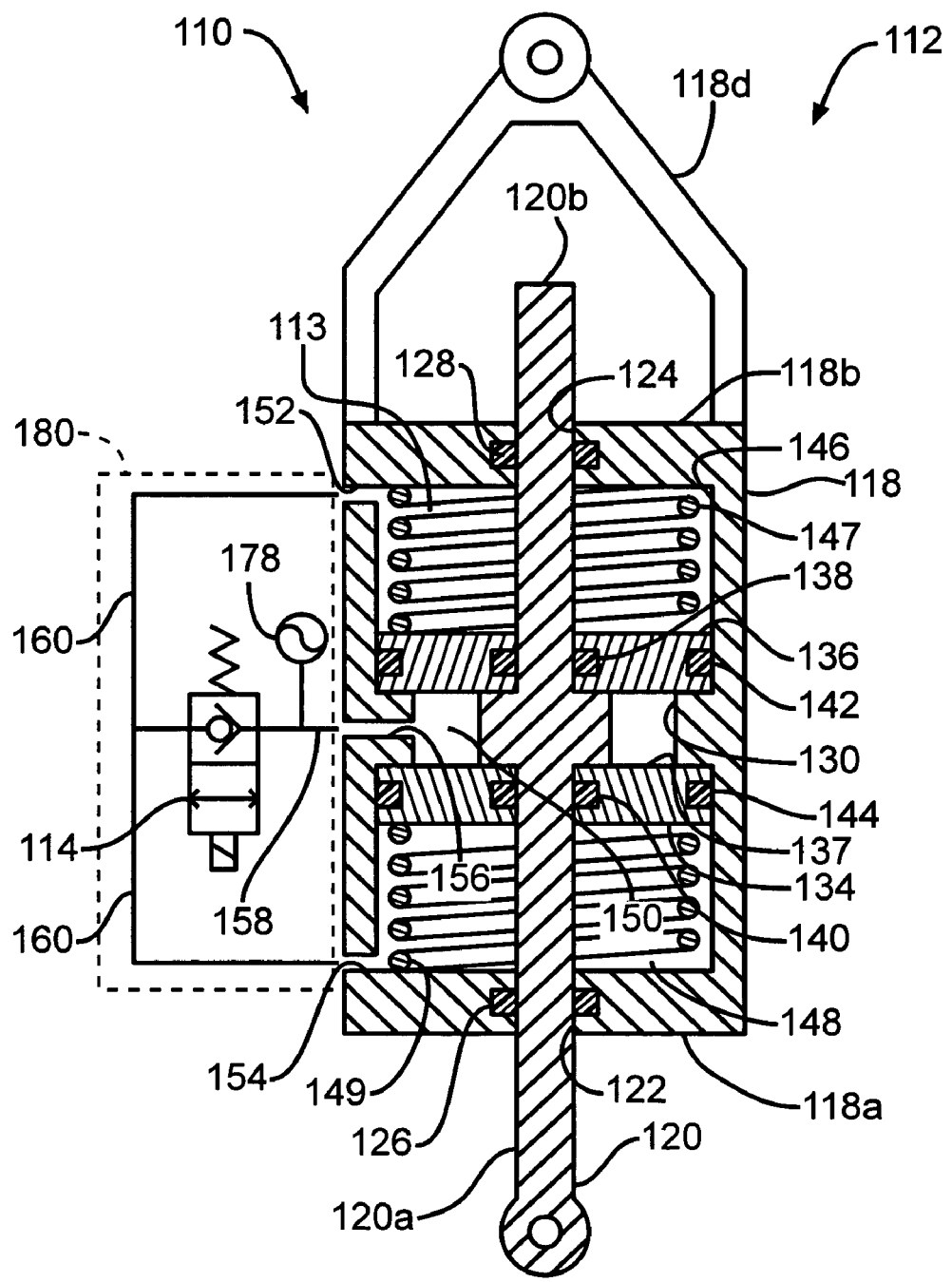
FIG. 3 is a schematic view of a first embodiment of a roll control system according to the present invention.
Figure 3A:
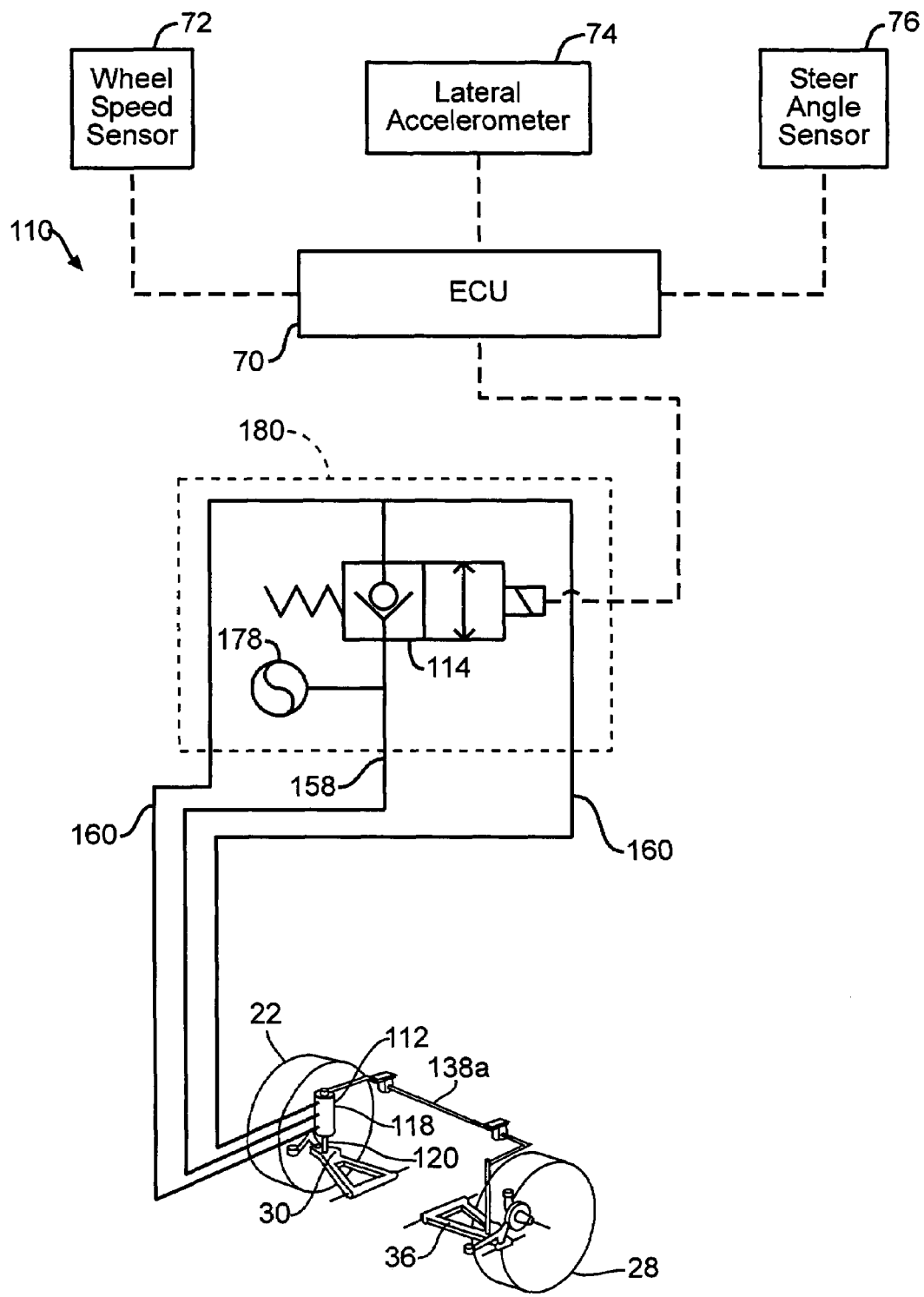
FIG. 3A is another schematic view of the roll control system shown in FIG. 3.

Referring again to the drawings, FIGS. 3 and 3A illustrate a roll control system, indicated generally at 110, in accordance with the present invention. Components that are similar to those illustrated in the vehicle illustrated in FIGS. 1 and 2 and discussed above, are labeled with the same numbers. The roll control system 110 comprises an actuator, indicated at 112, a check valve arrangement 114, and an accumulator 178. The check valve arrangement 114, and the accumulator 178 are preferably packaged in a unit 180. The unit 180 is preferably mounted near a spring member 138a. However, the unit 180 may be mounted near the actuator 112 or in any other suitable location. The invention will be described for a single actuator 112 and associated hydraulic circuit. However, it is to be understood that, as described above for the prior art roll control system, a second, rear actuator and corresponding hydraulic circuit would preferably also be provided. In other words, the roll control system 110 may be provided for front and rear anti-roll bars of a vehicle similar to that of the prior art roll control system described and illustrated in FIGS. 1 and 2. It should also be understood that if only one roll control system according to the invention is provided, it may be provided at either the front or rear of a vehicle, as suitable. Further, it must be understood that first and second actuators may be provided on the front or rear of the vehicle, or that first and second actuators may be provided on the front of the vehicle and third and fourth actuators on the rear of the vehicle.

The actuator 112 is provided for use similar to that described above for the prior art actuators 12 and 21. The actuator 112 includes a cylinder 118 and a rod 120 partially disposed in the cylinder 118. One of the cylinder 118 or the rod 120 of the actuator 112 is drivingly connected to one of the d spring member 138a and the suspension arm 30, while the other of the cylinder 118/rod 120 pair is drivingly connected to the other of the spring member 138a and the suspension arm 30, in a manner similar to that of the prior art roll control system described above with respect to FIG. 1.

The spring member 138a may be an anti-roll bar, similar to the anti-roll bar 38, a sway bar, or any other spring capable of connecting the sprung and unsprung portions of a vehicle to one another.

It must be understood that in the case where a pair of first and second actuators are provided on the front or rear of the vehicle, or the case where a pair of first and second actuators are provided on the front of the vehicle and a pair of third and fourth actuators are provided on the rear of the vehicle, the pair of actuators may act in place of the spring member 138a and in such a case the spring member 138 (or anti-roll bar 38) would not be included in the vehicle.

The rod 120 has a first end 120a provided with a structure for attaching the rod 120 to the spring member 138a or the suspension arm 30. The rod 120 has a second end 120b. A circumferentially extending flange 121 is formed on the rod 120 on a portion thereof intermediate the ends 120a and 120b. Preferably, the flange 121 is formed integrally to the rod 120. However, it must be understood that the flange may be formed in any suitable manner.

The cylinder 118 includes a first end wall 118a and a second end wall 118b. The cylinder 118 defines a hollow interior 113, i.e., a bore. The interior 113 is divided into an upper chamber 146, a center chamber 150, and a lower chamber 148, as will be discussed below. The cylinder 118 includes an attachment structure 118d suitable for connecting the cylinder 118 to one of the sprung portion of the vehicle or the unsprung portion of the vehicle at the second end wall 118b. The cylinder 118 includes a port 152 in fluid communication with the upper chamber 146. The cylinder 118 includes a port 156 in fluid communication with the center chamber 150. The cylinder 118 includes a port 154 in fluid communication with the lower chamber 148. The purpose of the ports 152, 156, and 154 will be discussed below. The cylinder 118 includes a first opening 122 in the first end wall 118a. The cylinder 118 includes a second opening 124 in the second end wall 118b. The purpose of the first and second openings 122 and 124 will be described below. The cylinder 118 includes an annular flange 130 extending inwardly into the interior 113, preferably in the center chamber 150 of the cylinder 118.

The first end 120a of the rod 120 extends through the first opening 122 of the cylinder 118. The second end 120b of the rod 120 extends through the second opening 124 of the cylinder 118. A first seal 126 is disposed within the first opening 122 and provides a fluid tight sliding seal between the rod 120 and the first end wall 118a. Similarly, a second seal 128 disposed within the second opening 124 and provides a fluid tight sliding seal between the rod 120 and the second end wall 118b.

The flange 121 of the rod 120 has an outer diameter which is less than the inner diameter of the annular flange 130 such that the rod 120 may reciprocate in the cylinder 118 without the flange 121 contacting the annular flange 130.

A first annular piston 134 is disposed within the cylinder 118 on one side of the annular flange 130. The piston 134 is disposed about the first end 120a of the rod 120. A second annular piston 136 is disposed within the cylinder 118 on the other side of the annular flange 130 from the piston 134. The piston 136 is disposed about the second end 120b of the rod 120. The first and second pistons 134 and 136 preferably each include inner sealing members 138, 140, respectively, providing a fluid tight sliding seal between the rod 120 and the associated one of the first piston 134 and the second piston 136. Similarly, outer sealing members 142 and 144 are provided on the outer circumference of the first piston 134 and the second piston 136, respectively, to provide a fluid tight sliding seal between the associated one of the first and second pistons 134 and 136 and the interior wall surface of the cylinder 118. The first and second pistons 134, 136 cooperate to divide the interior 113 of the cylinder 118 into the upper chamber 146 between the second end wall 118b of the cylinder 118 and the second piston 136, the lower chamber 148 between the first end wall 118a of the cylinder 118 and the first piston 134, and the center chamber 150 between the first piston 134 and the second piston 136. The flange 130 of the cylinder 118, and the flange 121 of the rod 120 are disposed within the interior 113.

The upper chamber 146 has a spring 147 disposed therein. The spring 147 urges the pistons 134 toward the annular flange 130. The lower chamber 148 has a spring 149 disposed therein. The spring 149 urges the pistons 136 toward the annular flange 130.

When the pistons 134 and 136 are positioned abutting the flange 130, the pistons 134 and 136 are in their respective neutral or "center" positions and the actuator 112 is in the neutral or "center" position thereof. Note that in this description of this embodiment of the invention, and I the embodiments described below, the use of the term "center" is general and does not necessarily imply an exact midpoint of the roll control system 110, the structure of the actuator 112, the cylinder 118, or even a midpoint of the range of travel of the rod 120 relative to the cylinder 118. The use of "center" is only meant to indicate a position not at an extreme end of travel of the rod 120 relative to the cylinder 118. It must be understood that neutral is intended to describe the preferred or normal position during generally smooth travel of the vehicle. Thus, the neutral position will typically be a center position, however it must be understood that the neutral position may be any suitable preferred position.

When the piston 134 is moved away from the flange 130 by the rod 120, the actuator 112 is elongated. When the piston 136 is moved away from the flange 130 by the rod 120, the actuator 112 is compressed. The rod 120 is in the neutral position thereof when the flange 121 in aligned (coplanar) with the flange 130 of the cylinder 118.

The upper chamber 146 of the cylinder 118 is associated with the port 152, through which a working medium such as hydraulic fluid may be supplied or released from the associated upper chamber 146 of the cylinder 118. The lower chamber 148 of the cylinder 118 is associated with the port 154, through which a working medium such as hydraulic fluid may be supplied or released from the associated lower chamber 148 of the cylinder 118. The center chamber 150 of the cylinder 118 is associated with the port 156, through which a working medium such as hydraulic fluid may be supplied or released from the associated center chamber 150 of the cylinder 118. The check valve arrangement 114 is in communication with the port 156 of the actuator 112 through a hydraulic line 158 and with the ports 152, 154 through a hydraulic line 160. The accumulator 178 is in fluid communication with the hydraulic line 158 between the check valve arrangement 114 and the port 156.

The check valve arrangement 114 is operated by a solenoid, and has an open position and a check position. When the check valve arrangement 114 is de-energized, it is in the check position, and the check element of the check valve arrangement 114 permits flow through the check valve arrangement 114 in the direction from the hydraulic line 158 to the hydraulic line 160 (i.e., from the port 156 to the ports 152 and/or 154) and prevents fluid flow through the check valve arrangement 114 in the opposite direction of flow. Thus, when the solenoid of the check arrangement 114 is deenergized, flow is prevented through the check valve arrangement 114 and the hydraulic unit 158 into the center chamber 150 via the port 156.

Except when roll control is desired (i.e., except when operating the vehicle along a relatively straight path), the solenoid of the check valve arrangement 114 is energized while the vehicle is in operation. When energized, the check valve arrangement 114 is in the open position such that the check valve arrangement 114 permits flow therethrough in either direction, and this fluid can flow in a direction from the ports 152, 154 toward the port 156. For example, when the check valve arrangement 114 is in the open position and the actuator 112 is elongated, the rod 120 is free to move such that the flange 121 moves toward the first end wall 118a and in turn moves the piston 134 toward the first end wall 118a. Similarly, for example, when the check valve arrangement 114 is in the open position and the actuator 112 is compressed, the rod 120 is free to move such that the flange 121 moves toward the second end wall 118b and in turn moves the piston 13b toward the second end wall 118b. The rod 120 and the piston 134 can move within the respective chamber 148, because as the piston 134 displaces fluid from the chambers 148, the fluid displaced may enter the center chamber 150. Similarly, the rod 120 and the pistons 136 can move within the chamber 146, because as the piston 136 displaces fluid from the chamber 146, the fluid may enter the center chamber 150. Conversely, as the piston 134 moves toward the flange 130, fluid displaced from the center chamber 150 passes through the check valve arrangement 114, and enters the chamber 148.

In response to actual or anticipated loading of the actuator 112, the solenoid is de-energized so that the check valve arrangement 114 moves to the check position. When the check valve arrangement 114 is de-energized, fluid may be released from the center chamber 150, but cannot be supplied to the center chamber 150 from the chambers 146, 148 as described above. For example, when the actuator 112 is in a neutral position, or slightly compressed under a load tending to compress the actuator 112, the rod 120 is prevented from movement away from the center of the cylinder 118, because to move away from the center of the cylinder 118, the rod 120 must drive the piston 136 toward the second end wall 118b, so that the fluid in the upper chamber must flow out of the port 152. However, no flow path into the chamber 150 for such flow exists if the check valve 114 is in the check position. Fluid also cannot flow into the chamber 148, because the piston 136 is against the flange 130 and cannot move to expand the volume of the chamber 148. However, even though the solenoid of the check arrangement 114 is deenergized flow is permitted out of the chamber 150. Thus, the piston 136 is free to move toward the neutral position thereof whenever the actuator 112 elongates (that is, when the flange 121 on the rod 120 moves toward the neutral position from the compressed position.) As the flange 121 on the rod 120 moves toward neutral, the piston 136 is urged to follow by the spring 147, and fluid is displaced from the contracting chamber 150 out the port 156, through the check valve arrangement 114, through the line 160 to the port 152 and into the expanding chamber 146.

Fluid flow is similarly prevented from leaving the chamber 148 if the rod 120 attempts to move away from the center (or from an initial elongated position) if the actuator 112 is subjected to forces tending to elongate the actuator 112. However, the rod 120 and the piston 134 are always free to move toward the neutral position thereof whether or not the solenoid of the check valve arrangement 114 is de-energized. When the rod 120 moves toward the neutral position thereof the piston 134 is pushed toward the neutral position thereof by the associated springs 149, and the fluid in the contracting chamber 150 flows through the check valve arrangement 114 to the expanding chamber 148 on the other side of the moving piston 134. The other piston 136 remains seated against the annular flange 130, even if contacted by the flange 121 of the rod 120, as long as the check valve arrangement 114 is deenergized and preventing flow into the chamber 150. It should be noted that no flow would be expected from the chamber 148 into the chamber 146, since if the rod 120 is urging the piston 134 away from the neutral position, the piston 136 will normally be abutting the flange 130; the chamber 146 would be unable to expand further to accept fluid from the chamber 148. In a preferred embodiment the spring force of the springs 147 and 149 is sufficient to move the pistons 136 and 134, respectively, at a fast enough rate, that under a rapid change of position under normal operating conditions if the flange 121 is pressing against one of the pistons 136 and 134 and the rod 120 move rapidly and the flange 121 presses against the other of the pistons 136 and 134, the first one of the pistons 136 and 134 will have to return to the neutral position thereof before the flange 121 passes to the neural position thereof to contact the other one of the piston 136 or 134. It is anticipated, however, that in other embodiments under a rapid change of position of the flange 121 if the flange 121 is pressing against one of the pistons 136 and 134 and the rod 120 move rapidly and the flange 121 presses against the other of the pistons 136 and 134, the flange 121 may return to the neutral position thereof before the first one of the pistons 136 and 134 will return to the neutral position thereof, and the flange 121 may have some slight movement out of the neutral position thereof.

It will be appreciated that the check valve arrangement 114 may be comprised of any valve arrangement that is capable of performing the functions described above. The check valve arrangement 114 may include a check valve and a bypass valve. The status of the bypass valve can be determined by any suitable method. One such method is to inductively measure the airgap via the drive circuit behavior, as described in U.S. Pat. No. 6,577,133 to Barron, the disclosures of which are incorporated herein by reference.

Unlike the prior art roll control system, when the solenoid of the check valve arrangement 114 is deenergized, the roll control system 110 allows the rod 120 to move toward the neutral position, while preventing the rod 120 from further moving away from the neutral position. Therefore, the associated spring member 138a is locked in position such that the associated spring member 138a cannot move in a direction away from the center, or neutral position, but can return to the center or neutral position. Thus, if the spring member 138a is initially locked into a position which causes the vehicle to be rolling an undesired amount, as the associated wheel encounter uneven road surfaces moving the wheel upward and downward (tending to alternately compress and elongate the actuator 112), the actuator 112 and the associated spring member 138a will work their way back to their respective neutral positions.

It must be understood that in the case where a pair of first and second actuators are provided on the front or rear of the vehicle, or the case where a pair of first and second actuators are provided on the front of the vehicle and a pair of third and fourth actuators are provided on the rear of the vehicle, case the spring member 138 would not be included in the vehicle, and the pair of actuators would selectively lock and unlock the sprung and unsprung portions of the vehicle. While unlocked the pair of actuators would act as spring members and smooth the ride of the vehicle.

The accumulator 178 is communicably connected to the hydraulic line 158 between the port 156 and the check valve arrangement 114. The accumulator 178 is provided to compensate for any amount of fluid that leaks out of the system over the life of the accumulator 178 and to account for density changes due to temperature changes. The accumulator 178 is preferably a low pressure accumulator operating at a pressure of about 2 bar to about 5 bar.

Figure 4:
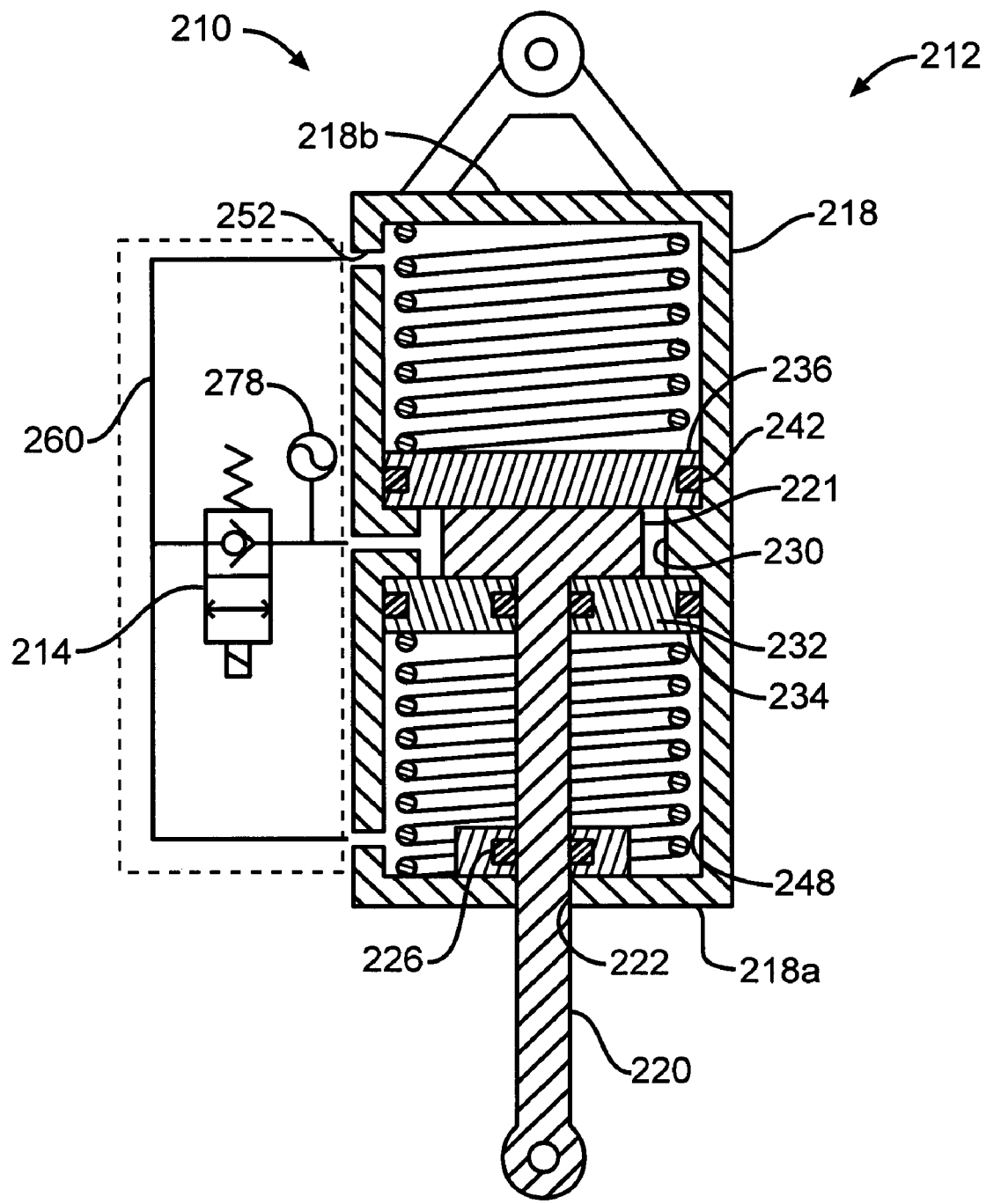
FIG. 4 is a schematic view of a second embodiment of a roll control system according to the present invention.

Referring now to FIG. 4, there is illustrated a second embodiment of a roll control system, indicated generally at 210, in accordance with the present invention. The roll control system 210 is similar to the roll control system 110, and similar elements therein have been numbered using corresponding numbers incremented by 100. Only those elements of the roll control system 210 that differ from the elements described for the roll control system 110 will be described. The invention will be described for a single actuator 212 and hydraulic circuit. However, it is to be understood that, as described above, a second, rear actuator and corresponding hydraulic circuit similar to the single actuator 212 and associated hydraulic circuit would preferably also be provided.

The actuator 212 includes a cylinder 218. The cylinder 218 has a first end wall 218a and a second end wall 218b. A rod 220 extends through an opening 222 in the first end wall 218a of the cylinder 218 and into the chamber of the cylinder 218. The rod 220 is mounted for reciprocal movement in the chamber of the cylinder 218. A seal 226 is disposed within the opening 222 to provide a sliding fluid tight seal between the rod 220 and the cylinder 218. Unlike the rod 120 of the prior embodiment, the rod 220 does not extend through a second opening in the cylinder 218. Thus, the exterior seals required in the cylinder 218 is reduced to one, namely the seal 226.

On the end of the rod 220 disposed within the cylinder 218, the rod 220 includes a circumferentially extending flange 221 that extends outwardly into the interior 113 of the cylinder 218 such that the rod 220 may reciprocate within the cylinder 218 without the flange 221 contacting the annular flange 230. A first annular piston 234 is disposed within the cylinder 218 on one side of the annular flange 230 and the flange 221. A second piston 236 is disposed within the cylinder 218 on the other side of the annular flange 230 and the flange 221 of the rod 220. The second piston 236 is not an annular member, as was the first piston 136, and the rod 220 does not extend through the second piston 236. The second piston 236 may include an outer sealing member 242 providing a fluid tight sliding seal between the second piston 236 and the inner wall of the cylinder 218. The first piston 234 is similar to the first piston 134. The first and second pistons 234 and 236 cooperate to divide the interior of the cylinder 218 into an upper chamber 246, a lower chamber 248, and a center chamber 250 in a manner generally similar to the manner described for the system 110.

Because a varying portion of the rod 220 may extend into the cylinder 218, the volume within the cylinder 218 occupied by the rod 220 varies. Therefore, the accumulator 278 must compensate not only for changes in fluid pressure due to temperature changes of the system 210, and changes in fluid volume due to the loss of fluid leakage from the system 210, but also the potential changes in the fluid volume within the rest of the system 210 due to the movement of a portion of the rod 220 in and out of the cylinder 218 of the system 210.

The system 210 includes a fluid conduit 260 connecting the upper chamber 246 and the lower chamber 248. The fluid conduit 260 also communicates with the chamber 250 via a check valve arrangement 214. The check valve arrangement 214 includes a solenoid 214a, which, when energized, positions the check valve arrangement 214 into an "open" position, in which fluid can flow in either direction therethrough the check valve arrangement 214, between the fluid conduit 260 and the chamber 250. When the solenoid 214a is deenergized, the check valve arrangement 214 is positioned to a "check" position, in which fluid can flow from the chamber 250 into the fluid conduit 260, but fluid cannot flow from the fluid conduit 260 into the chamber 250 through the check valve arrangement 214.

The system 210 further includes an accumulator 278, which is in continues fluid communication with the chamber 250.

For example, when the solenoid 214a of the check valve arrangement 214 is energized to position the check valve arrangement 214 in the open position, and the actuator 212 is acted upon by external force compression, the rod 220, and in turn the piston 236, are free to move toward the second end wall 218b. However, when the solenoid 214a of the check valve 214 is deenergized to position the check valve arrangement 214 in the check position, the piston 236, and in turn the rod 220, are restricted from moving away from the neutral position, or the flange 230.

For example, when the solenoid 214a of the check valve arrangement 214 is energized to position the check valve arrangement 214 in the open position, and the actuator 212 is acted upon by external force elongation, the rod 220, and in turn the piston 234, are free to move toward the first end wall 218a. However, when the solenoid 214a of the check valve 214 is deenergized to position the check valve arrangement 214 in the check position, the piston 234, and in turn the rod 220, are restricted from moving away from the neutral position, or the flange 230.

For further example, in the case where the check valve arrangement 214 is normally open, when the check valve arrangement 214 is deenergized and the actuator 212 is compressed, the rod 220, and in turn the piston 236 are free to move toward a second end 218b. Additionally, when the check valve arrangement 214 is deenergized and the actuator 212 is elongated, the rod 220, and in turn the piston 234 are free to move toward the first end 218a.

Similarly, for further example, in the case where the check valve arrangement 214 is normally open, when the check valve arrangement 214 is energized the piston 236, and in turn the rod 220, are restricted from moving away from the neutral position, or the flange 230. Additionally, when the check valve arrangement 214 is energized the piston 234, and in turn, the rod 220 are restricted from moving away from the neutral position, or the flange 230.

Figure 5:
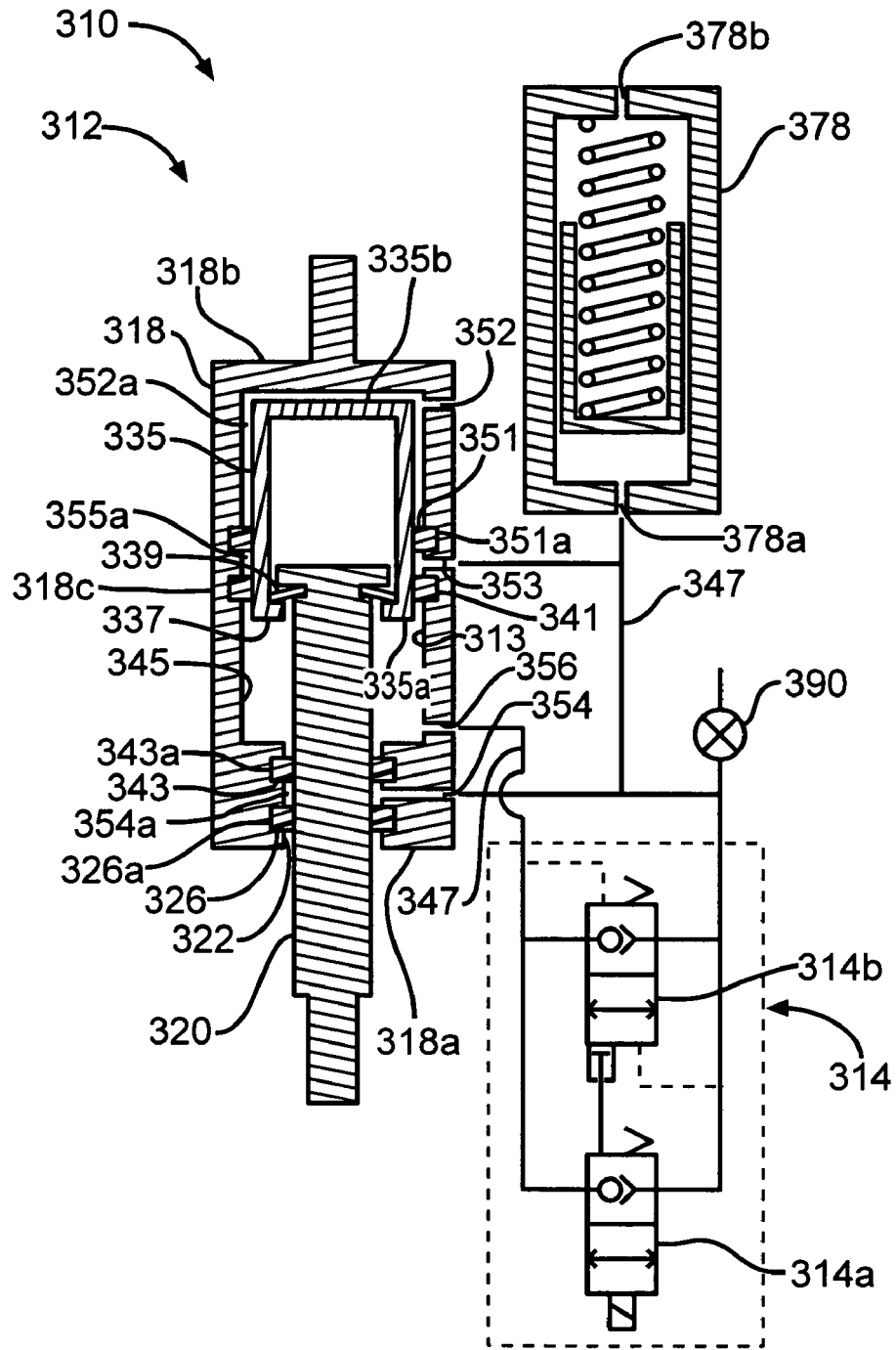
FIG. 5 is a schematic view of a third embodiment of a roll control system according to the present invention.

Referring now to FIG. 5, there is illustrated a third embodiment of a roll control system, indicated generally at 310, in accordance with the present invention. The roll control system 310 is generally similar to the roll control system 110, described above. Only those elements of the roll control system 310 that differ from the elements described for the roll control system 110 will be described. The invention will be described for a single actuator 312 and hydraulic circuit. However, it is to be understood that, as described above, a second actuator and corresponding hydraulic circuit would also be provided for a vehicle so that roll control systems are provided the front and the rear of the vehicle. The roll control system 310 may be used on the vehicle in a manner similar to that described above for the first embodiment.

The actuator 312 includes a cylinder 318. The cylinder 318 has a first end wall 318a, a second end wall 318b, and a cylindrical wall 318c extending between the first end wall 318a and the second end wall 318b. The cylindrical wall 318c has an internal surface defining a bore 313. There is an axial opening 322 formed through the first end wall 318a. The second end wall 318b is preferably adapted to be connected to one of the sprung portion and the unsprung portion of the vehicle.

The cylinder 318 has a first radial port 354. The first port 354 is formed radially through the first end wall 318a. The cylinder 318 has a second radial port 356. The second port 356 is formed radially through the cylindrical wall 318c adjacent the first end wall 318a. The cylinder 318 has a fourth radial port 352. The fourth port 352 is formed radially through the cylindrical wall 318c adjacent the second end wall 318b. The fourth port 352 is a vent to atmosphere. The cylinder 318 has a third radial port 353. The third port 353 is formed radially through the cylindrical wall 318c between the second radial port 356 and the fourth radial port 352. The purpose of the ports 352, 353, 354, and 356 will be further discussed below.

The cylinder 318 has a first groove 326a formed on the internal surface of the axial opening 322 in the end wall 318a adjacent the exterior of the cylinder 318 for receiving a first seal 326. The cylinder 318 has a second groove 343a formed on the internal surface of the axial opening 322 in the end wall 318a, adjacent the interior of the cylinder 318, for receiving a second seal 343.

The cylinder 318 has a third groove 341a formed on the internal surface of the cylindrical wall 318c between the first end wall 318a and the second end wall 318b for receiving a third seal 341. The cylinder 318 has a fourth groove 351a formed on the internal surface of the cylindrical wall 318c, at a location spaced longitudinally slightly apart from the third groove 341a, between the third groove 341a and the second end wall 318b, for receiving a fourth seal 351.

A cup-shaped piston 335 is disposed within the cylinder 318. The piston has a first end 335a and a second end 335b. The first end 335a of the piston 335 is an open end and faces the first end 318a of the cylinder 318. The second end 335b of the piston 335 is a closed end and faces the second end 318b of the cylinder 318. The piston 335 includes an annular flange 337 proximate the first end 335a. The flange 337 extends radially inwardly. The purpose of the flange 337 will be discussed below.

A rod 320 extends through the axial opening 322 in the cylinder 318 into the interior of the cylinder 318 and through the open first end 335a of the piston 335. The rod 320 is mounted on the cylinder 318 for reciprocal movement therewith. The seal 326 disposed within the axial opening 322 provides a sliding fluid tight seal between the rod 320 and the cylinder 318. Note that, unlike the rod 120 of the first embodiment, the rod 320 does not extend through a second opening in the cylinder 318; accordingly some differences in operation (described below) will be required.

On the end of the rod 320 disposed within the piston 335, the rod 320 includes a circumferentially extending flange 321 that extends outwardly into the interior of the piston 335. The rod 320 has a circumferential groove 321a that is disposed proximate the flange 321. An annular cushion 339 is preferably provided between the annular flange 337 and the flange 321, although such is not required, provided the diameter of the flange 321 on the rod is greater than the inside diameter of the opening in the first end 335a of the piston 335, defined by the annular flange 337. Most preferably, the cushion 339 is disposed within the groove 321a. The annular cushion 339 is most preferably a Bellville washer. The annular flange 337 of the piston 335 and the annular cushion 339 cooperate to retain the flange 321 of the rod 320 within the piston 335. It will be appreciated that a similar annular cushion may be adapted for use in any of the other embodiments described herein although such a cushion may not be shown.

The first seal 326 and the second seal 343 cooperate with the cylinder 318 and the rod 320 to define an annular first fluid chamber 354a within the cylinder 318. The first fluid chamber 354a is in fluid communication with the first port 354. The second seal 343, the third seal 341, the piston 335, the rod 320 and the cylinder 318 cooperate to define a variable volume second fluid chamber 345 within the cylinder 318. The second fluid chamber 345 is in fluid communication with the second port 356. The second fluid chamber 345 is also in fluid communication with the interior of the piston 335, as the cushion 339 does not form a fluid tight seal between the rod 320 and the piston 335. The third seal 341 and the fourth seal 351 cooperate with the piston 335 and the cylinder 318 to define an annular third fluid chamber 353a within the cylinder 318. The third fluid chamber 353a is in fluid communication with the third port 353. The fourth seal 351 and the second end wall 318b cooperate with the piston 335 and the cylinder 318 to define a variable volume fourth fluid chamber 352a within the cylinder 318. The fourth fluid chamber 352a is vented to atmosphere via the fourth port 352.

The roll control system 310 includes an accumulator 378. As illustrated, the accumulator 378 is most preferably a conventional low-pressure spring accumulator, although such is not required. The accumulator 378 includes a first port 378a. The accumulator includes a second port 378b. The second port 378b acts as a vent to atmosphere. It will be appreciated that any accumulator suitable for the use described herein, and any of the accumulators shown or described herein may be used in any of the embodiments of the invention.

The first port 354 of the cylinder 318 is connected to the first port 378a of the accumulator 378 via a hydraulic line 347 and functions to maintain the fluid between the seals 326 and 343 at the same pressure as the accumulator 378. Thus, the fluid between the seals 326 and 343 would not experience a damaging pressure build up because of, for example, a change in temperature. Similarly, the third port 353 of the cylinder 318 is connected to the first port 378a of the accumulator 378 via the hydraulic line 347 and also functions to maintain the fluid between the seals 341 and 351 at the same pressure as the accumulator 378.

The roll control system 310 includes a check valve arrangement 314. The check valve arrangement 314 includes a primary small opening valve 314a and a secondary big opening valve 314b, the purpose of which will be discussed below. The check valve arrangement 314 is illustrated in the deenergized "check" position of each of the valves 314a and 314b, only allowing flow from the hydraulic line 347 through the check valve arrangement 314 into the cylinder 318 via the port 356. When the valves 314a and 314b are energized, the check valve arrangement 314 is said to be in the energized, flow-through, or open position, in which fluid can flow not only into the port 356 from the check valve arrangement 314, but also out of the port 356 through the check valve arrangement 314 into the hydraulic line 347.

Figure 6:
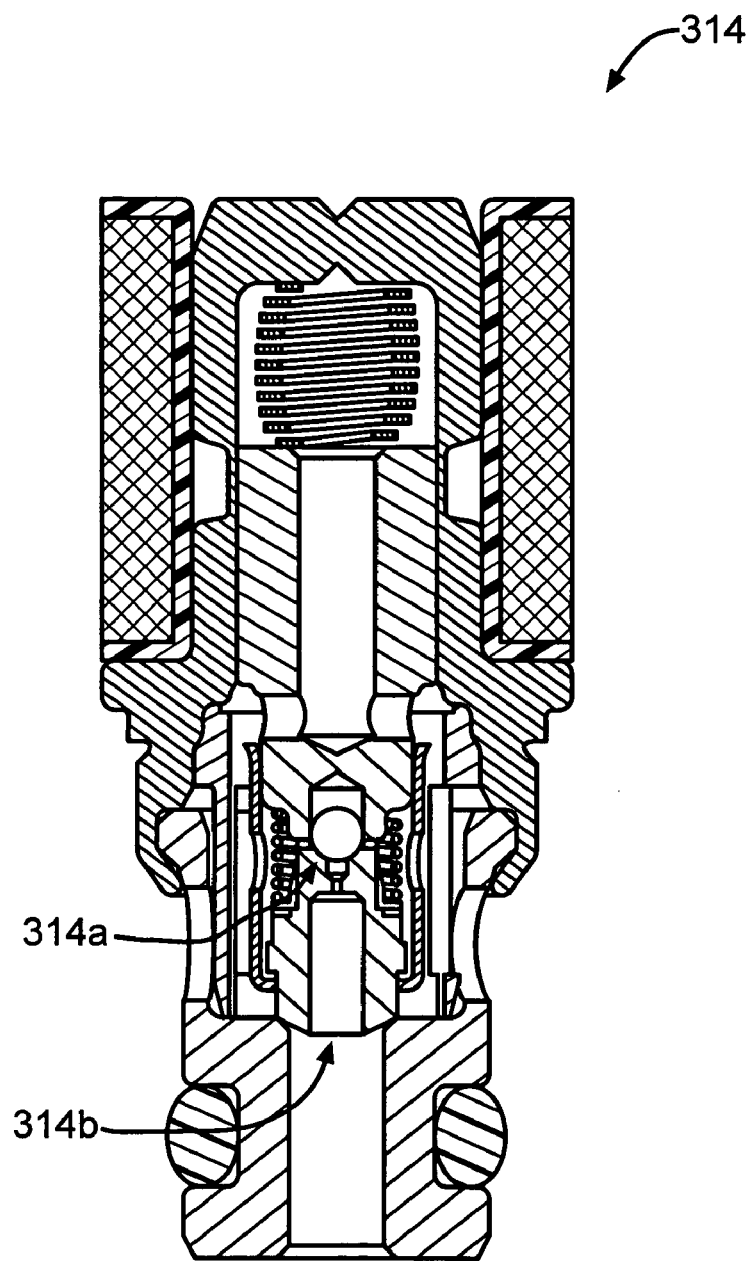
FIG. 6 is a cross-sectional view of the check valve arrangement shown schematically in FIG. 5.

An embodiment of the check valve arrangement 314 is illustrated in FIG. 6. The check valve arrangement 314 is preferably a typical two-stage solenoid check valve. It must be understood however that any suitable valve arrangement may be used. The check valve arrangement 314 has the primary small opening valve 314a that is opened to decrease the differential pressure across the valve. Once the pressure has decreased such that the pressure exerted on the valve is less than the electromagnetic force exerted on the check valve arrangement 314, a secondary big opening valve 314b is opened. In this manner, there is a controlled release of the differential pressure.

The check valve arrangement 314 performs the same general function of the check valve arrangement 114. However, the check valve arrangement 314 additionally provides for a controlled release of pressure when the check valve arrangement 314 is switched from a de-energized to an energized state. When the primary small opening valve 314a is energized fluid may flow though the check valve arrangement 314 at a relatively slow rate as the primary small opening valve 314a will be partially open, and the primary small opening valve 314a will not be able to open the secondary big opening valve 314b until the pressure acting on the secondary big opening valve 314b has dropped sufficiently such that the force of the primary small opening valve 314a acting on the secondary big opening valve 314b may over come the pressure acting on the secondary big opening valve 314b.

The port 356 is communicably connects the second chamber 345 with the check valve arrangement 314, and via the check valve arrangement 314 and the hydraulic line 347 to the accumulator 378.

The roll control system 310 includes a charge port 390. The charge port 390 is connected to the hydraulic line 347. The normally closed charge port 390 can suitably be manually opened to drain and charge the system as needed, for example, for regular maintenance, or for primary charging during manufacture or installation. The fluid in the actuator 312 is kept under some pressure by the accumulator 378. More specifically, the difference in pressure in the chamber 345 and atmospheric pressure acts on the piston 335 to urge the piston 335 toward the second end wall 318b. During operation, as will be described below, the actuator 312 may be subjected to tensile forces sufficient that the force due to this differential pressure is overcome and the rod 320 may pull the piston 335 away from the end wall 318b.

As illustrated in FIG. 5, the rod 320 and the piston 335 are in the neutral position relative to the cylinder 318. When the check valve arrangement 314 is energized, the rod 320 and the piston 335 may freely reciprocate within the cylinder 318 as needed. The movement of the rod 320 and the piston 335 into a compressed position will displace fluid from the second chamber 345 as more of the rod 320 is moved into the interior of the cylinder 318. The displaced fluid is stored in the accumulator 378. Conversely, as the actuator 312 is elongated and less of the rod 320 is disposed in the cylinder 318, fluid from the accumulator 378 will be drawn through the open check valve arrangement 314 into the cylinder 318, until the rod 320 moves to the illustrated neutral position and the annular cushion 339 contacts the flange 337 of the piston 335, and starts to move the piston 335 away from the second end wall 318b. Once that occurs, fluid will be displaced from the second chamber 345 into the accumulator 378 (the diameter of the piston 335 being greater than that of the rod 320 being withdrawn from the chamber 345).

When the check valve arrangement 314 is de-energized, e.g., the roll control system 310 is engaged, fluid cannot exit the cylinder 318 through the second port 356, and thus the rod 320 and piston 335 are locked relative to the cylinder 318 such that the rod 320 cannot extend further into the piston 335. For the same reason, the piston 335 cannot move lower into the second chamber 345. However, fluid may flow from the accumulator 378 into the second chamber 345, if the fluid pressure within the accumulator 378 is greater than the fluid pressure within the second chamber 345, which generally it will be, except for transient loading induced between the sprung and the unsprung portion of the vehicle. Thus, the rod 320 and the piston 335 will be allowed to return to the neutral position if either is not in the neutral position when the check valve arrangement 314 is de-energized.

Similar to the operation described above in regard to the second embodiment, because a varying portion of the rod 320 may extend into the cylinder 318, the volume within the cylinder 318 occupied by the rod 320 varies. Therefore, the accumulator 378 must compensate not only for change in fluid pressure due to the loss in fluid due to leakage from the system 310, but also the potential change in volume within the system 310 due to the movement of a portion of the rod 320 in and out of the closed system of the cylinder 318 of the system 310.

As described above, if the pressure within the accumulator 378 is higher than that of the pressure within the second chamber 345, fluid from the accumulator 378 may feed into the second chamber 345 through the check valve arrangement 314, even when the check valve arrangement 314 is de-energized. The inclusion of a spring within the accumulator 378 adjusts the volume within the accumulator 378 so that the accumulator 378 will keep the system 310 pressurized and thus continually urge the piston 335 into the neutral position, while the check valve arrangement 314 is in the open position. It must be understood however that any suitable accumulator may be used.

As the vehicle on which the system 310 travels, the actuator 312 of the roll control system 310 will be occasionally subjected to forces tending to compress the actuator 312, and will be subjected to forces tending to elongate the actuator 312. With the check valve arrangement 314 energized, fluid is free to flow in either direction through the check valve arrangement 314, and thus can freely flow into and out of the cylinder 318. This means that the actuator 312 is relatively free to elongate and to be compressed, allowing the suspension of the vehicle to absorb these forces to give a smoother ride. This would normally be the case when driving straight along relatively smooth roads. However, when conditions exist in which it would be desirable to enhance roll control, the check valve arrangement 314 can be deenergized.

If the check valve arrangement 314 is deenergized when the actuator 312 is in the neutral position thereof (as illustrated in FIG. 5), the rod 320 and the cylinder 318 are hydraulically locked in position relative to one another, and will not move from the neutral position. If the actuator 312 is subjected to compressive forces during this "locked in neutral" condition, fluid within the second chamber 345 is prevented from flowing out of the second port 356, because the check valve arrangement 314 is blocking such flow. The piston 335 is already against the second end wall 318b of the cylinder 318. Thus, the rod 320 cannot move from the neutral position relative to the cylinder 318 to allow the actuator 312 to compress. Similarly, if the actuator 312 is subjected to forces tending to elongate the actuator 312 during this "locked in neutral" condition, fluid within the second chamber 345 is prevented from flowing out of the second port 356, because the check valve arrangement 314 is blocking such flow. Thus, the rod 320 cannot move from the neutral position relative to the cylinder 318 to allow the actuator 312 to elongate.

If the check valve arrangement 314 is deenergized when the actuator 312 is in a compressed position thereof, the actuator 312 will be prevented from moving toward a more compressed position thereof (if additional compressive force acts on the actuator 312). Just as in the case discussed in the preceding paragraph, if the actuator 312 is subjected to additional compressive forces while in this "locked when compressed" condition, fluid within the second chamber 345 is prevented from flowing out of the second port 356, because the check valve arrangement 314 is blocking such flow. Thus, the rod 320 cannot move from the compressed position relative to the cylinder 318 that was existent when the check valve arrangement 314 was shut, toward a more compressed position of the actuator 312.

However, when the actuator 312 in this compressed position and is subjected to forces tending to elongate the actuator 312, the actuator 312 is free to move toward the neutral position thereof. As the rod 320 is moved by these elongating forces, the second chamber 345 increases in volume, lowering the pressure of the fluid within the volume. Until the actuator 312 reaches the neutral position (or the check valve arrangement 314 is re-energized), fluid is free to flow into the second chamber 345 via the second port 356 and the check valve arrangement 314 from the accumulator 378 via the hydraulic line 347, to fill the expanding second chamber 345. However, once the rod 320 has moved to the neutral position, further movement would cause the piston 335 to move away from the second end wall 318b of the cylinder 318, which would tend to displace fluid from the second chamber 345, as described above. Thus, further movement tending to cause the actuator 312 to move to an extended position is prevented by the check valve arrangement 314 as described above.

Similarly, if the check valve arrangement 314 is deenergized when the actuator 312 is in an elongated position thereof, the actuator 312 will be prevented from moving toward a more elongated position thereof (if additional tensile force acts on the actuator 312). As was discussed above, if the actuator 312 is subjected to additional tensile forces while in this "locked when elongated" condition, fluid within the second chamber 345 is prevented from flowing out of the second port 356, because the check valve arrangement 314 is blocking such flow. Thus, the rod 320 cannot move from the elongated position relative to the cylinder 318 that was existent when the check valve arrangement 314 was shut, toward a more elongated position of the actuator 312.

However, when the actuator 312 in this elongated position and is subjected to forces tending to compress the actuator 312, the actuator 312 is free to move toward the neutral position thereof. As the rod 320 and the piston 335 are moved by these compressive forces, the second chamber 345 increases in volume, decreasing the pressure of the fluid within the volume. Until the actuator 312 reaches the neutral position (or the check valve arrangement 314 is re-energized), fluid is free to flow into of the second chamber 345 via the second port 356 and the check valve arrangement 314 into the accumulator 378 via the hydraulic line 347. However, once the rod 320 has moved to the neutral position, the rod 320 no longer travels with the piston 335, and therefore further movement causing the actuator 312 to move to a compressed position is prevented by the check valve arrangement 314 as described above, since further compressive movement of the rod 320 would require fluid to flow out of the second chamber 345 via the port 356 and through the deenergized check valve arrangement 314.

Figure 7:
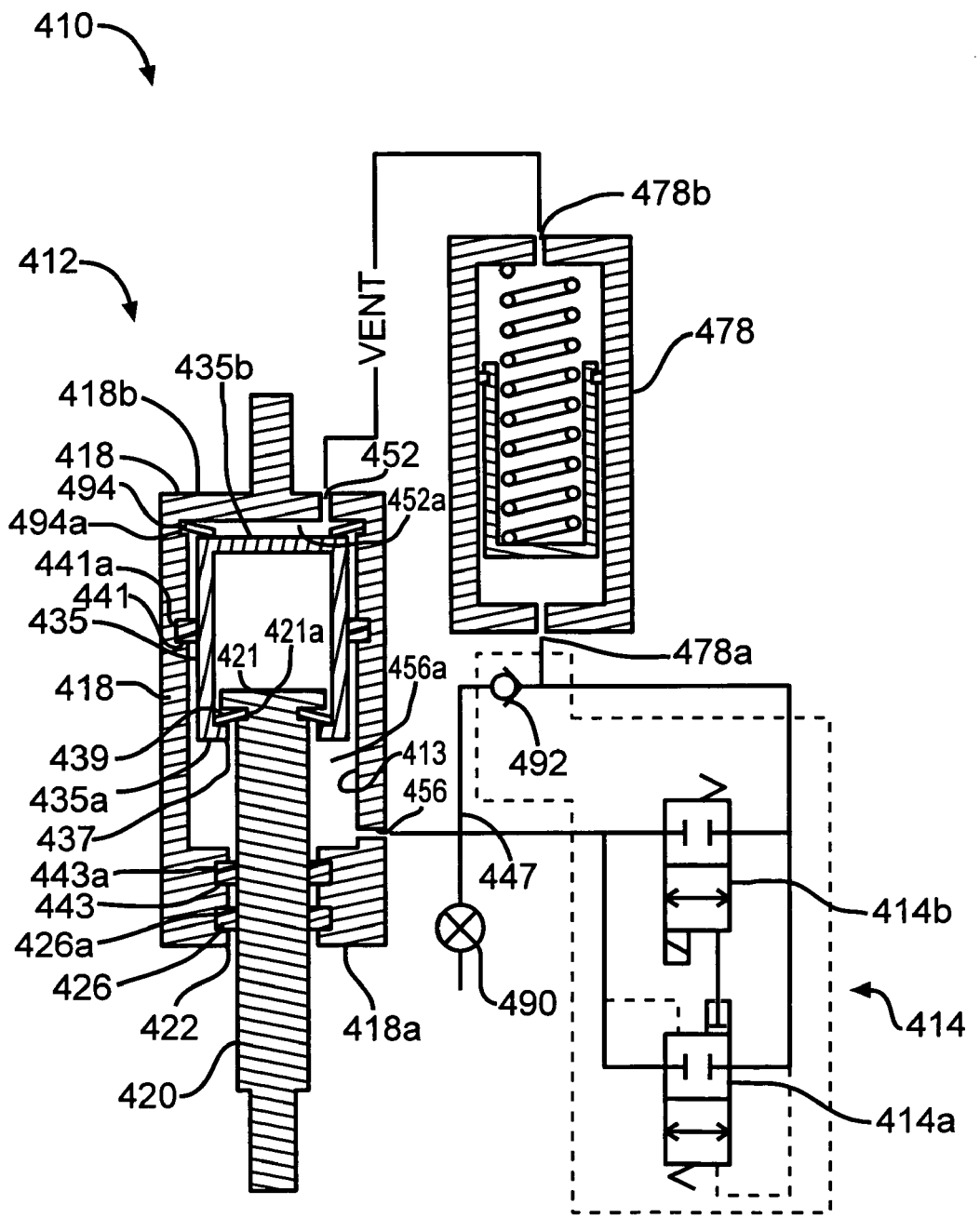
FIG. 7 is a schematic view of a fourth embodiment of a roll control system according to the present invention.

Referring now to FIG. 7, there is illustrated a fourth embodiment of a roll control system, indicated generally at 410, in accordance with the present invention. The roll control system 410 is generally similar to the roll control system 310, described above. Only those elements of the roll control system 410 that differ from the elements described for the roll control system 310 will be described. The invention will be described for a single actuator 412 and hydraulic circuit. However, it is to be understood that, as described above, a second actuator and corresponding hydraulic circuit would also be provided for a vehicle so that roll control systems are provided the front and the rear of the vehicle. The roll control system 410 may be used on the vehicle in a manner similar to that described above for the first embodiment.

The actuator 412 includes a cylinder 418. The cylinder 318 has a first end wall 418a, a second end wall 418b, and a cylindrical wall 418c extending between the first end wall 318a and the second end wall 318b. The cylindrical wall 418c has an internal surface defining a bore 413. There is an axial opening 422 formed through the first end wall 418a. The second end wall 418b is preferably adapted to be connected to one of the sprung portion and the unsprung portion of the vehicle.

The cylinder 418 has a radial port 456. The radial port 456 is formed radially through the cylindrical wall 418c adjacent the first end wall 418a. The cylinder 418 has an offset axial port 452. The offset axial port 452 is formed axially offset through the second end wall 418b of the cylinder 418. The purpose of the ports 452, and 456 will be further discussed below.

The cylinder 418 has a first groove 426a formed on the internal surface of the axial opening 422 in the end wall 418a adjacent the exterior of the cylinder 418 for receiving a first seal 426. The cylinder 418 has a second groove 443a formed on the internal surface of the axial opening 422 in the end wall 418a, adjacent the interior of the cylinder 418, for receiving a second seal 443.

The cylinder 418 has a third groove 441a formed on the internal surface of the cylindrical wall 418c between the first end wall 418a and the second end wall 418b for receiving a third seal 441. The cylinder 418 has a fourth groove 494a formed on the internal surface of the cylindrical wall 418c, at a location adjacent the second end wall 418b, between the third groove 441a and the second end wall 418b, for receiving a piston cushion 494.

A cup-shaped piston 435 is disposed within the cylinder 418. The piston has a first end 435a and a second end 435b. The first end 435a of the piston 435 is an open end and faces the first end 418a of the cylinder 418. The second end 435b of the piston 435 is a closed end and faces the second end 418b of the cylinder 418. The piston 435 includes an annular flange 437 proximate the first end 435a. The flange 437 extends radially inwardly. The purpose of the flange 437 will be discussed below.

A rod 420 extends through the axial opening 422 in the cylinder 418 into the interior of the cylinder 418 and through the open first end 435a of the piston 435. The rod 420 is mounted on the cylinder 418 for reciprocal movement therewith. The seals 426 and 443 disposed within the axial opening 422 provide a sliding fluid tight seal between the rod 420 and the cylinder 418. Note that, similar to the rod 320 of the third embodiment and unlike the rod 120 of the first embodiment, the rod 420 does not extend through a second opening in the cylinder 418; accordingly some differences in operation, as compared to the first embodiment, (described below) will be required.

On the end of the rod 420 disposed within the piston 435, the rod 420 includes a circumferentially extending flange 421 that extends outwardly into the interior of the piston 435. The rod 420 has a circumferential groove 421a that is disposed proximate the flange 421. An annular cushion 439 is preferably provided between the annular flange 437 and the flange 421, although such is not required, provided the diameter of the flange 421 on the rod is greater than the inside diameter of the opening in the first end 435 a of the piston 435, defined by the annular flange 437. Most preferably, the cushion 439 is disposed within the groove 421a. The annular cushion 439 is most preferably a Bellville washer. The annular flange 437 of the piston 435 and the annular cushion 439 cooperate to retain the flange 421 of the rod 420 within the piston 435. It will be appreciated that a similar annular cushion may be adapted for use in any of the other embodiments described herein although such a cushion may not be shown.

The second seal 443, the third seal 441, the piston 435, the rod 420 and the cylinder 418 cooperate to define a first variable volume fluid chamber 345 within the cylinder 418. The first fluid chamber 445 is in fluid communication with the first port 456. The first fluid chamber 445 is also in fluid communication with the interior of the piston 435, as the cushion 439 does not form a fluid tight seal between the rod 420 and the piston 435. The third seal 441, the piston 435, and the cylinder 418 cooperate to define a second variable volume fluid chamber 452a within the cylinder 318. The second fluid chamber 452a is in fluid communication with the second port 452.

The roll control system 410 includes an accumulator 478. As illustrated, the accumulator 478 is most preferably a conventional low-pressure spring accumulator, although such is not required. The accumulator 478 includes a first port 478a. The accumulator includes a second port 478b. The second port 478b cooperatively vents with the offset axial port 452. It will be appreciated that any accumulator suitable for the use described herein, and any of the accumulators shown or described herein may be used in any of the embodiments of the invention.

The roll control system 410 includes a check valve arrangement 414. The check valve arrangement 414 includes a primary small opening valve 414a and a secondary big opening valve 414b, the purpose of which will be discussed below. The check valve arrangement 414 further includes an independent check valve 492. The independent check valve 492 allowing flow only in the direction from the first port 478a of the accumulator 478 to the first port 456 of the cylinder 418. The check valve arrangement 414 is illustrated in the deenergized "check" position with each of the valves 314a and 314b closed and not allowing any flow therethrough. Thus, the check valve arrangement 314 is only allowing flow from the accumulator 478 through the check valve arrangement 414 into the cylinder 418 via the port 456. When the valves 414a and 414b are energized, the check valve arrangement 414 is said to be in the energized, flow-through, or open position, in which fluid can flow not only into the port 456 from the check valve arrangement 414, but also out of the port 456 through the check valve arrangement 414 into the accumulator 478.

The primary small opening valve 414a and the secondary big opening valve 414b of the check valve arrangement 414 preferably form a typical two-stage solenoid valve. It must be understood however that any suitable valve arrangement may be used. The check valve arrangement 414 has the primary small opening valve 414a that is opened to decrease the differential pressure across the valve. Once the pressure has decreased such that the pressure exerted on the valve is less than the electromagnetic force exerted on the check valve arrangement 414, a secondary big opening valve 414b is opened. In this manner, there is a controlled release of the differential pressure.

The check valve arrangement 414 performs the same general function of the check valve arrangement 414. However, similar to the check valve arrangement 314, the check valve arrangement 414 additionally provides for a controlled release of pressure when the check valve arrangement 414 is switched from a de-energized to an energized state. When the primary small opening valve 414a is energized fluid may flow though the check valve arrangement 414 at a relatively slow rate as the primary small opening valve 414a will be partially open, and the primary small opening valve 414a will not be able to open the secondary big opening valve 414b until the pressure acting on the secondary big opening valve 414b has dropped sufficiently such that the force of the primary small opening valve 414a acting on the secondary big opening valve 414b may over come the pressure acting on the secondary big opening valve 414b.

The port 456 is communicably connects the first chamber 445 with the check valve arrangement 414, and via the check valve arrangement 414 and the hydraulic line 447 to the accumulator 478.

The roll control system 410 includes a charge port 490. The charge port 490 is connected to the hydraulic line 447. The normally closed charge port 490 can suitably be manually opened to drain and charge the system as needed, for example, for regular maintenance, or for primary charging during manufacture or installation. The fluid in the actuator 412 is kept under some pressure by the accumulator 478. More specifically, the difference in pressure in the chamber 445 and the pressure in the chamber 452a acts on the piston 435 to urge the piston 435 toward the second end wall 418b. During operation, as will be described below, the actuator 412 may be subjected to tensile forces sufficient that the force due to this differential pressure is overcome and the rod 420 may pull the piston 435 away from the end wall 418*b*.

As illustrated in FIG. 7, the rod 420 and the piston 435 are in the neutral position relative to the cylinder 418. When the check valve arrangement 414 is energized, the rod 420 and the piston 435 may freely reciprocate within the cylinder 418 as needed. The movement of the rod 420 and the piston 435 into a compressed position will displace fluid from the first chamber 445 as more of the rod 420 is moved into the interior of the cylinder 418. The displaced fluid is stored in the accumulator 478. Conversely, as the actuator 412 is elongated and less of the rod 420 is disposed in the cylinder 418, fluid from the accumulator 478 will be drawn through the open check valve arrangement 414 into the cylinder 418, until the rod 420 moves to the illustrated neutral position and the annular cushion 439 contacts the flange 437 of the piston 435, and starts to move the piston 435 away from the second end wall 418*b*. Once that occurs, fluid will be displaced from the first chamber 445 into the accumulator 478 (the diameter of the piston 435 being greater than that of the rod 420 being withdrawn from the chamber 445).

When the check valve arrangement 414 is de-energized, e.g., the roll control system 410 is engaged, fluid cannot exit the cylinder 418 through the first port 456, and thus the rod 420 and piston 435 are locked relative to the cylinder 418 such that the rod 420 cannot extend further into the piston 435. For the same reason, the piston 435 cannot move lower into the first chamber 445. However, fluid may flow from the accumulator 478 into the first chamber 445, if the fluid pressure within the accumulator 478 is greater than the fluid pressure within the first chamber 445, which generally it will be, except for transient loading induced between the sprung and the unsprung portion of the vehicle. Thus, the rod 420 and the piston 435 will be allowed to return to the neutral position if either is not in the neutral position when the check valve arrangement 414 is de-energized.

Similar to the operation described above in regard to the second and third embodiments, because a varying portion of the rod 420 may extend into the cylinder 418, the volume within the cylinder 418 occupied by the rod 420 varies. Therefore, the accumulator 478 must compensate not only for change in fluid pressure due to the loss in fluid due to leakage from the system 410, but also the potential change in volume within the system 410 due to the movement of a portion of the rod 420 in and out of the closed system of the cylinder 418 of the system 410.

As described above, if the pressure within the accumulator 478 is higher than that of the pressure within the first chamber 445, fluid from the accumulator 478 may feed into the first chamber 445 through the check valve arrangement 414, even when the check valve arrangement 414 is de-energized. The inclusion of a spring within the accumulator 478 adjusts the volume within the accumulator 478 so that the accumulator 478 will keep the system 410 pressurized and thus continually urge the piston 435 into the neutral position, while the check valve arrangement 414 is in the open position. It must be understood however that any suitable accumulator may be used.

As the vehicle on which the system 410 travels, the actuator 412 of the roll control system 410 will be occasionally subjected to forces tending to compress the actuator 412, and will be subjected to forces tending to elongate the actuator 412. With the check valve arrangement 414 energized, fluid is free to flow in either direction through the check valve arrangement 414, and thus can freely flow into and out of the cylinder 418. This means that the actuator 412 is relatively free to elongate and to be compressed, allowing the suspension of the vehicle to absorb these forces to give a smoother ride. This would normally be the case when driving straight along relatively smooth roads. However, when conditions exist in which it would be desirable to enhance roll control, the check valve arrangement 414 can be deenergized.

If the check valve arrangement 414 is deenergized when the actuator 412 is in the neutral position thereof (as illustrated in FIG. 7), the rod 420 and the cylinder 418 are hydraulically locked in position relative to one another, and will not move from the neutral position. If the actuator 412 is subjected to compressive forces during this "locked in neutral" condition, fluid within the first chamber 445 is prevented from flowing out of the first port 456, because the check valve arrangement 414 is blocking such flow. The piston 435 is already against the second end wall 418*b* of the cylinder 418. Thus, the rod 420 cannot move from the neutral position relative to the cylinder 418 to allow the actuator 412 to compress. Similarly, if the actuator 412 is subjected to forces tending to elongate the actuator 412 during this "locked in neutral" condition, fluid within the first chamber 445 is prevented from flowing out of the first port 456, because the check valve arrangement 414 is blocking such flow. Thus, the rod 420 cannot move from the neutral position relative to the cylinder 418 to allow the actuator 412 to elongate.

If the check valve arrangement 414 is deenergized when the actuator 412 is in a compressed position thereof, the actuator 412 will be prevented from moving toward a more compressed position thereof (if additional compressive force acts on the actuator 412). Just as in the case discussed in the preceding paragraph, if the actuator 412 is subjected to additional compressive forces while in this "locked when compressed" condition, fluid within the first chamber 445 is prevented from flowing out of the first port 456, because the check valve arrangement 414 is blocking such flow. Thus, the rod 420 cannot move from the compressed position relative to the cylinder 418 that was existent when the check valve arrangement 414 was shut, toward a more compressed position of the actuator 412.

However, when the actuator 412 in this compressed position and is subjected to forces tending to elongate the actuator 412, the actuator 412 is free to move toward the neutral position thereof. As the rod 420 is moved by these elongating forces, the first chamber 445 increases in volume, lowering the pressure of the fluid within the volume. Until the actuator 412 reaches the neutral position (or the check valve arrangement 414 is re-energized), fluid is free to flow into the first chamber 445 via the first port 456 and the check valve arrangement 414 from the accumulator 478 via the hydraulic line 447, to fill the expanding first chamber 445. However, once the rod 420 has moved to the neutral position, further movement would cause the piston 435 to move away from the second end wall 418*b* of the cylinder 418, which would tend to displace fluid from the first chamber 445, as described above. Thus, further movement tending to cause the actuator 412 to move to an extended position is prevented by the check valve arrangement 414 as described above.

Similarly, if the check valve arrangement 414 is deenergized when the actuator 412 is in an elongated position thereof, the actuator 412 will be prevented from moving toward a more elongated position thereof (if additional tensile force acts on the actuator 412). As was discussed above, if the actuator 412 is subjected to additional tensile forces while in this "locked when elongated" condition, fluid within the first chamber 445 is prevented from flowing out of the first port 456, because the check valve arrangement 414 is blocking such flow. Thus, the rod 420 cannot move from the elongated position relative to the cylinder 418 that was existent when the check valve arrangement 414 was shut, toward a more elongated position of the actuator 412.

However, when the actuator 412 in this elongated position and is subjected to forces tending to compress the actuator 412, the actuator 412 is free to move toward the neutral position thereof. As the rod 420 and the piston 435 are moved by these compressive forces, the first chamber 445 increases in volume, decreasing the pressure of the fluid within the volume. Until the actuator 412 reaches the neutral position (or the check valve arrangement 414 is re-energized), fluid is free to flow into of the first chamber 445 via the first port 456 and the check valve arrangement 414 into the accumulator 478 via the hydraulic line 447. However, once the rod 420 has moved to the neutral position, the rod 420 no longer travels with the piston 435, and therefore further movement causing the actuator 412 to move to a compressed position is prevented by the check valve arrangement 414 as described above, since further compressive movement of the rod 420 would require fluid to flow out of the first chamber 445 via the port 456 and through the deenergized check valve arrangement 414.

Figure 8:
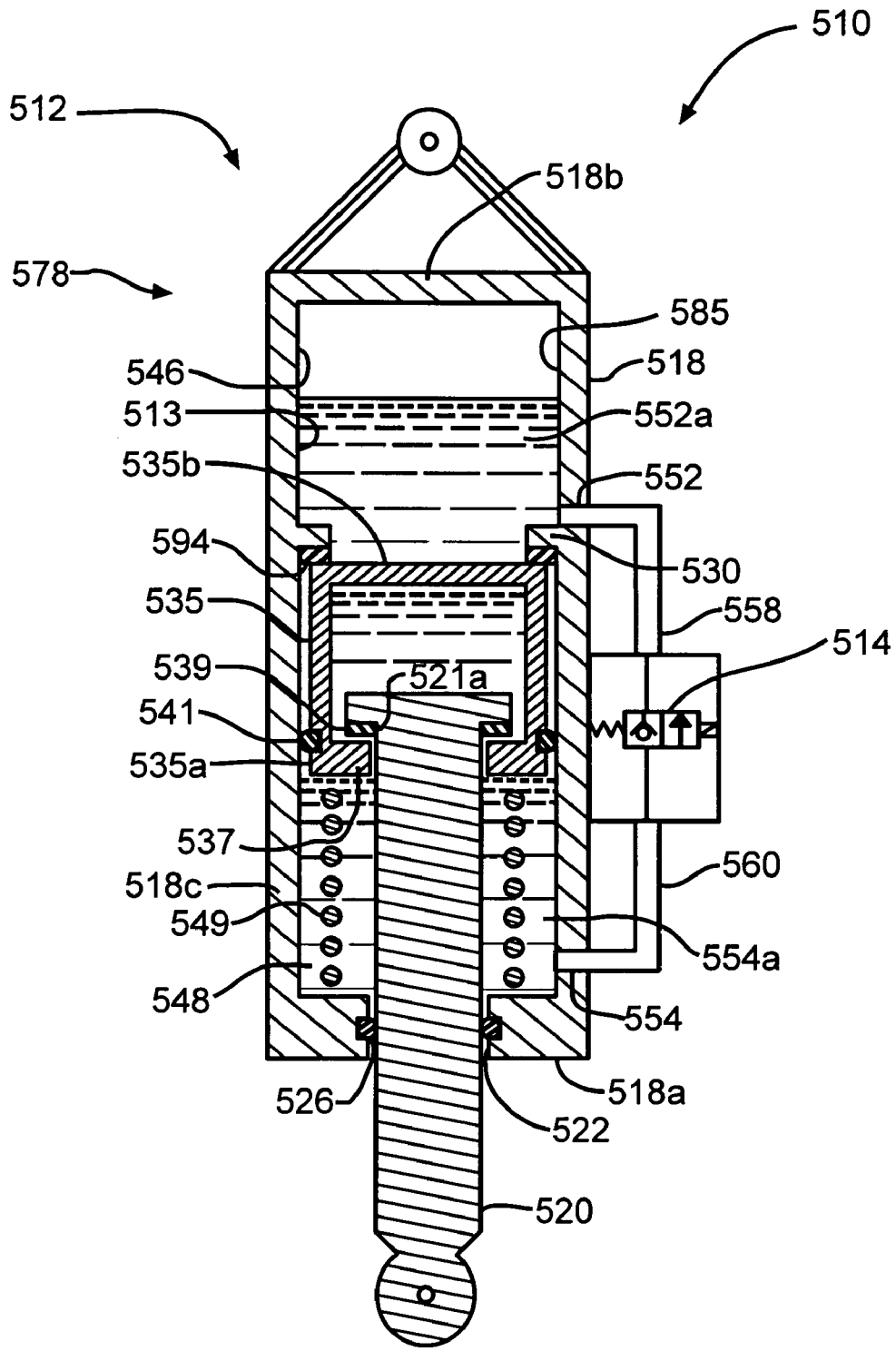
FIG. 8 is a schematic view of a fifth embodiment of a roll control system according to the present invention.

Referring now to FIG. 8, there is illustrated a fifth embodiment of a roll control system, indicated generally at 510, in accordance with the present invention. The roll control system 510 is generally similar to the roll control system 510 and generally similar to the roll control system 210, described above. Only those elements of the roll control system 510 that differ from the elements described for the roll control systems 510 and 210 will be described. The invention will be described for a single actuator 512 and hydraulic circuit. However, it is to be understood that, as described above, a second actuator and corresponding hydraulic circuit would also be provided for a vehicle so that roll control systems are provided the front and the rear of the vehicle. The roll control system 510 may be used on the vehicle in a manner similar to that described above for the first embodiment.

The actuator 512 has an integrated accumulator 578. The accumulator 578 is a strut with a gas spring 549. The accumulator 578 operates similarly as to the low pressure accumulator as described in the prior embodiments. Additionally, the actuator 512 does not have any vents to atmosphere. The actuator 512 has an upper chamber 585 that is partially filled with oil with the remaining volume filled with gas.

The actuator 512 includes a cylinder 518. The cylinder 518 has a first end wall 518a, a second end wall 518b, and a cylindrical wall 518c extending between the first end wall 518a and the second end wall 518b. The cylindrical wall 518c has an internal surface defining a bore 513. There is an axial opening 522 formed through the first end wall 518a. The second end wall 518b is preferably adapted to be connected to one of the sprung portion and the unsprung portion of the vehicle. The cylinder 518 includes an annular flange 530 extending inwardly into the interior 513, preferably in approximately the center of the cylindrical wall 518c of the cylinder 118, i.e., between the first end wall 518a and the second end wall 518b.

The cylinder 518 has a first radial port 554. The first port 554 is formed radially through the cylindrical wall 518c adjacent the first end wall 518a. The cylinder 518 has a second radial port 552. The second port 552 is formed radially through the cylindrical wall 518c adjacent the flange 530. The purpose of the ports 552 and 554 will be further discussed below.

A first seal 526 is disposed in the opening 522. A second seal 541 is disposed in the interior of the cylinder 518 about the cylindrical wall 518c.

A cup-shaped piston 535 is disposed within the cylinder 518. The piston has a first end 535a and a second end 535b. The first end 535a of the piston 535 is an open end and faces the first end 518a of the cylinder 518. The second end 535b of the piston 535 is a closed end and faces the second end 518b of the cylinder 518. The piston 535 includes an annular flange 537 proximate the first end 535a. The flange 537 extends radially inwardly. The purpose of the flange 537 will be discussed below. The second seal 541 is disposed between the cylindrical wall 518c and the piston 535 and provides a sliding fluid tight seal between a first chamber 554a and a second chamber 552a.

A rod 520 extends through the axial opening 522 in the cylinder 518 into the interior of the cylinder 518 and through the open first end 535a of the piston 535. The rod 520 is mounted on the cylinder 518 for reciprocal movement therewith. The seal 526 disposed within the axial opening 522 provides a sliding fluid tight seal between the rod 520 and the cylinder 518. Note that, similar to the rod 320 of the third embodiment and unlike the rod 120 of the first embodiment, the rod 520 does not extend through a second opening in the cylinder 518; accordingly some differences in operation, as compared to the first embodiment, (described below) will be required.

On the end of the rod 520 disposed within the piston 535, the rod 520 includes a circumferentially extending flange 521 that extends outwardly into the interior of the piston 535. The flange 521 forms a circumferential shelf 521a that is disposed facing the open end 535a of the piston 535. An annular cushion 539 is preferably provided between the annular flange 537 and the flange 521, although such is not required, provided the diameter of the flange 521 on the rod is greater than the inside diameter of the opening in the first end 535a of the piston 535, defined by the annular flange 537. Most preferably, the cushion 539 is disposed on the shelf 521a. The annular cushion 539 is most preferably a Bellville washer. The annular flange 537 of the piston 535 and the annular cushion 539 cooperate to retain the flange 521 of the rod 520 within the piston 535. It will be appreciated that a similar annular cushion may be adapted for use in any of the other embodiments described herein although such a cushion may not be shown.

The first seal 526 and the second seal 541 cooperate with the cylinder 518, the piston 535, and the rod 520 to define the annular variable volume first fluid chamber 554a within the cylinder 518. The first fluid chamber 554a is in fluid communication with the first port 554. The first fluid chamber 554a is also in fluid communication with the interior of the piston 535, as the cushion 539 does not form a fluid tight seal between the rod 520 and the piston 535. The second seal 541, the piston 535, and the cylinder 518 cooperate to define the variable volume second fluid chamber 552a within the cylinder 518. The second fluid chamber 552a is in fluid communication with the second port 552.

The roll control system 510 includes an integrated accumulator 578. As illustrated, the accumulator 578 is most preferably a strut with the gas spring 549 spring accumulator. It will be appreciated that any accumulator suitable for the use described herein, and any of the accumulators shown or described herein may be used in any of the embodiments of the invention.

The roll control system 510 includes a check valve arrangement 514. The check valve arrangement 514 is similar to the check valve arrangement 114 of the first embodiment. The first port 554 is in fluid communication with the check valve arrangement 514 via a first hydraulic line 560. The second port 552 is in fluid communication with the check valve arrangement 514 via a second hydraulic line 558. The check valve arrangement 514 is illustrated in the deenergized "check" position, only allowing flow from the second port 552 via the second hydraulic line 558 through the check valve arrangement 514 into the chamber 554a through the first port 554 via the first hydraulic line 560. When the check valve arrangement 514 is said to be in the energized, flow-through, or open position, in which fluid can flow not only into the first port 554 from the check valve arrangement 514, but also out of the port 554 through the check valve arrangement 514 into the second port 552. The check valve arrangement 514 performs the same general function of the check valve arrangement 114

The port 554 is communicably connects the first chamber 554a with the check valve arrangement 514, and via the check valve arrangement 514 and to the accumulator 578.

The fluid in the first chamber 554a is kept under some pressure by the accumulator 578. More specifically, the difference in pressure in the first chamber 554a and pressure in the second chamber 552a acts on the piston 535 to urge the piston 535 toward the flange 530. During operation, as will be described below, the actuator 512 may be subjected to tensile forces sufficient that the force due to this differential pressure is overcome and the rod 520 may pull the piston 535 away from the flange 530.

As illustrated in FIG. 8, the rod 520 and the piston 535 are in the neutral position relative to the cylinder 518. When the check valve arrangement 514 is energized, the rod 520 and the piston 535 may freely reciprocate within the cylinder 518 as needed. The movement of the rod 520 and the piston 535 into a compressed position will displace fluid from the first chamber 554a as more of the rod 520 is moved into the interior of the cylinder 518. The displaced fluid is stored in second chamber 552a, i.e., the accumulator 578. Conversely, as the actuator 512 is elongated and less of the rod 520 is disposed in the cylinder 518, fluid from the accumulator 578 will be drawn through the open check valve arrangement 514 into the cylinder 518, until the rod 520 moves to the illustrated neutral position and the annular cushion 539 contacts the flange 537 of the piston 535, and starts to move the piston 535 away from the flange 530. Once that occurs, fluid will be displaced from the first chamber 554a into the accumulator 578 (the diameter of the piston 535 being greater than that of the rod 520 being withdrawn from the chamber 554a).

When the check valve arrangement 514 is de-energized, e.g., the roll control system 510 is engaged, fluid cannot exit the first chamber 554a through the first port 554, and thus the rod 520 and piston 535 are locked relative to the cylinder 518 such that the rod 520 cannot extend further into the piston 535. For the same reason, the piston 535 cannot move lower into the first chamber 554a. However, fluid may flow from the accumulator 578 into the first chamber 554a, if the fluid pressure within the accumulator 578 is greater than the fluid pressure within the first chamber 554a, which generally it will be, except for transient loading induced between the sprung and the unsprung portion of the vehicle. Thus, the rod 520 and the piston 535 will be allowed to return to the neutral position if either is not in the neutral position when the check valve arrangement 514 is de-energized.

Similar to the operation described above in regard to the second embodiment, because a varying portion of the rod 520 may extend into the cylinder 518, the volume within the first chamber 554a occupied by the rod 520 varies. Therefore, the accumulator 578 must compensate not only for change in fluid pressure due to the loss in fluid due to leakage from the system 510, but also the potential change in volume within the system 510 due to the movement of a portion of the rod 520 in and out of the closed system of the cylinder 518 of the system 510. The volume of gas in the second chamber 552a allow the system 510 to compensate for this change in pressure and/or volume.

As described above, if the pressure within the accumulator 578 is higher than that of the pressure within the first chamber 554a, fluid from the accumulator 578 may feed into the first chamber 554a through the check valve arrangement 514, even when the check valve arrangement 514 is de-energized. The inclusion of a spring within the strut adjusts the volume within the accumulator 578 so that the accumulator 578 will keep the system 510 pressurized and thus continually urge the piston 535 into the neutral position, while the check valve arrangement 514 is in the open position. It must be understood however that any suitable accumulator may be used.

As the vehicle on which the system 510 travels, the actuator 512 of the roll control system 510 will be occasionally subjected to forces tending to compress the actuator 512, and will be subjected to forces tending to elongate the actuator 512. With the check valve arrangement 514 energized, fluid is free to flow in either direction through the check valve arrangement 514, and thus can freely flow into and out of the cylinder 518. This means that the actuator 512 is relatively free to elongate and to be compressed, allowing the suspension of the vehicle to absorb these forces to give a smoother ride. This would normally be the case when driving straight along relatively smooth roads. However, when conditions exist in which it would be desirable to enhance roll control, the check valve arrangement 514 can be deenergized.

If the check valve arrangement 514 is deenergized when the actuator 512 is in the neutral position thereof (as illustrated in FIG. 8), the rod 520 and the cylinder 518 are hydraulically locked in position relative to one another, and will not move from the neutral position. If the actuator 512 is subjected to compressive forces during this "locked in neutral" condition, fluid within the first chamber 554a is prevented from flowing out of the first port 554, because the check valve arrangement 514 is blocking such flow. The piston 535 is already against the flange 530 of the cylinder 518. Thus, the rod 520 cannot move from the neutral position relative to the cylinder 518 to allow the actuator 512 to compress. Similarly, if the actuator 512 is subjected to forces tending to elongate the actuator 512 during this "locked in neutral" condition, fluid within the first chamber 554a is prevented from flowing out of the first port 554, because the check valve arrangement 514 is blocking such flow. Thus, the rod 520 cannot move from the neutral position relative to the cylinder 518 to allow the actuator 512 to elongate.

If the check valve arrangement 514 is deenergized when the actuator 512 is in a compressed position thereof, the actuator 512 will be prevented from moving toward a more compressed position thereof (if additional compressive force acts on the actuator 512). Just as in the case discussed in the preceding paragraph, if the actuator 512 is subjected to additional compressive forces while in this "locked when compressed" condition, fluid within the first chamber 554a is prevented from flowing out of the first port 554, because the check valve arrangement 514 is blocking such flow. Thus, the rod 520 cannot move from the compressed position relative to the cylinder 518 that was existent when the check valve arrangement 514 was shut, toward a more compressed position of the actuator 512.

However, when the actuator 512 in this compressed position and is subjected to forces tending to elongate the actuator 512, the actuator 512 is free to move toward the neutral position thereof. As the rod 520 is moved by these elongating forces, the first chamber 554a increases in volume, lowering the pressure of the fluid within the volume. Until the actuator 512 reaches the neutral position (or the check valve arrangement 514 is re-energized), fluid is free to flow into the first chamber 554a via the first port 554 and the check valve arrangement 514 from the accumulator 578 via the second hydraulic line 558, to fill the expanding first chamber 554a. However, once the rod 520 has moved to the neutral position, further movement would cause the piston 535 to move away from the flange 530 of the cylinder 518, which would tend to displace fluid from the first chamber 554a, as described above. Thus, further movement tending to cause the actuator 512 to move to an extended position is prevented by the check valve arrangement 514 as described above.

Similarly, if the check valve arrangement 514 is deenergized when the actuator 512 is in an elongated position thereof, the actuator 512 will be prevented from moving toward a more elongated position thereof (if additional tensile force acts on the actuator 512). As was discussed above, if the actuator 512 is subjected to additional tensile forces while in this "locked when elongated" condition, fluid within the first chamber 554a is prevented from flowing out of the first port 554, because the check valve arrangement 514 is blocking such flow. Thus, the rod 520 cannot move from the elongated position relative to the cylinder 518 that was existent when the check valve arrangement 514 was shut, toward a more elongated position of the actuator 512.

However, when the actuator 512 in this elongated position and is subjected to forces tending to compress the actuator 512, the actuator 512 is free to move toward the neutral position thereof. As the rod 520 and the piston 535 are moved by these compressive forces, the first chamber 554a increases in volume, decreasing the pressure of the fluid within the volume. Until the actuator 512 reaches the neutral position (or the check valve arrangement 514 is re-energized), fluid is free to flow into of the first chamber 554a via the first port 554 and the check valve arrangement 514 into the accumulator 578 via the second hydraulic line 558. However, once the rod 520 has moved to the neutral position, the rod 520 no longer travels with the piston 535, and therefore further movement causing the actuator 512 to move to a compressed position is prevented by the check valve arrangement 514 as described above, since further compressive movement of the rod 520 would require fluid to flow out of the first chamber 554a via the port 556 and through the deenergized check valve arrangement 514.

Figure 9:
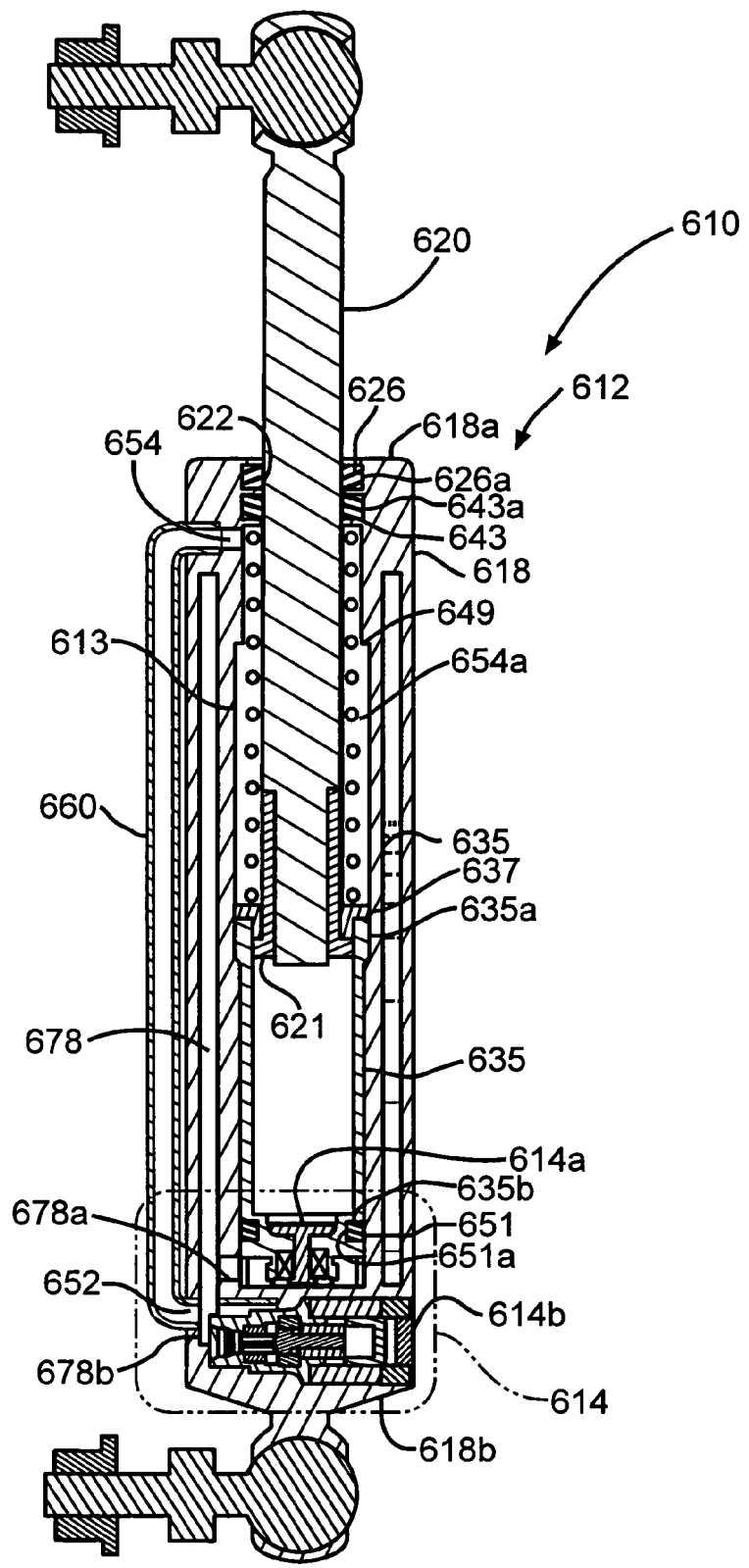
FIG. 9 is a schematic view of a sixth embodiment of a roll control system according to the present invention.
Figure 10:
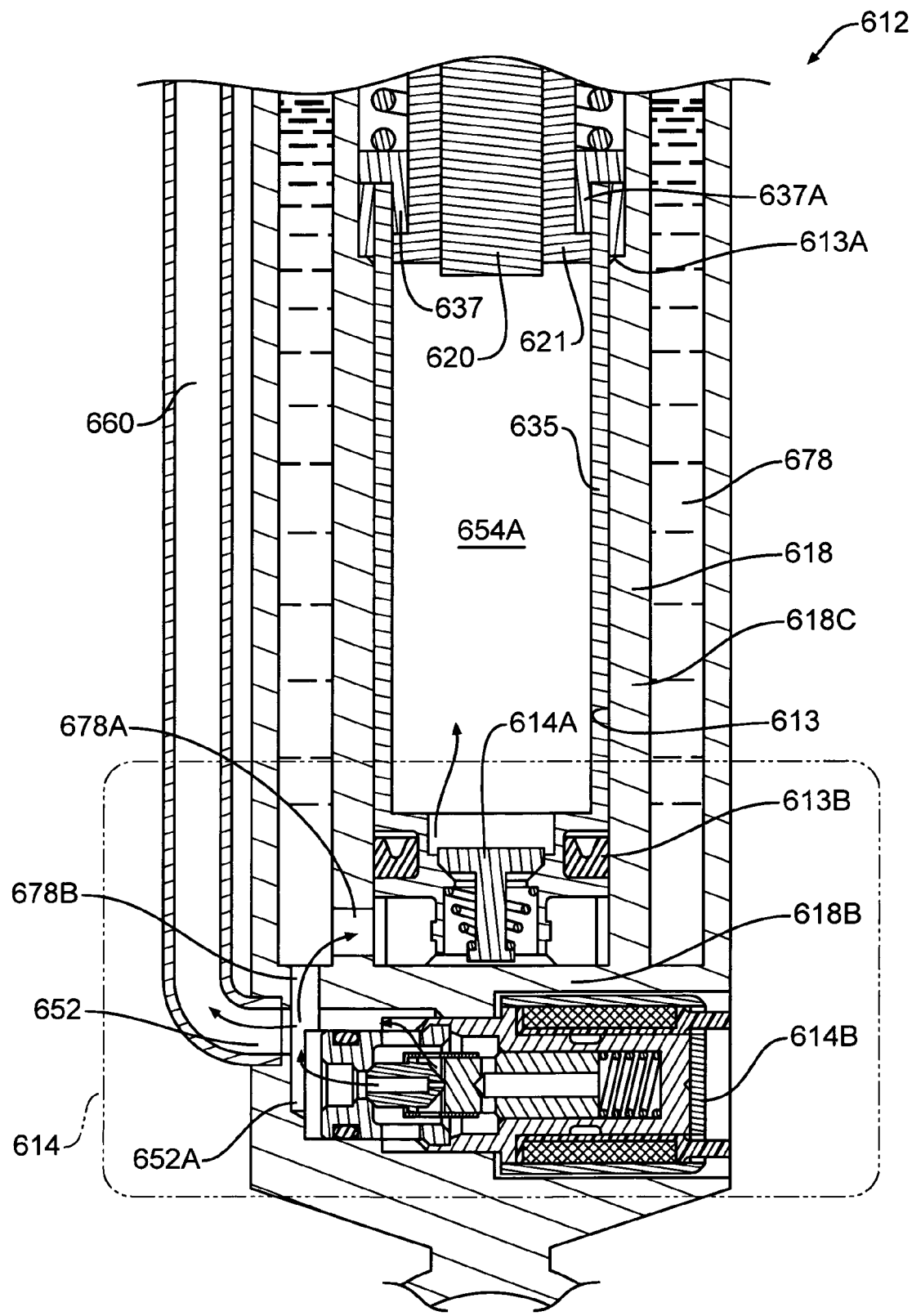
FIG. 10 is an enlarged view of a portion of the sixth embodiment shown in FIG. 9

Referring now to FIGS. 9 and 10, there is illustrated a sixth embodiment of a roll control system, indicated generally at 610, in accordance with the present invention. The roll control system 610 is generally similar to the roll control systems of the embodiments described above. Only those elements of the roll control system 610 that differ from the elements described for the roll control systems above will be described. The invention will be described for a single actuator 612. However, it is to be understood that, as described above, a second actuator and corresponding hydraulic circuit would also be provided for a vehicle so that roll control systems are provided the front and the rear of the vehicle. The roll control system 610 may be used on the vehicle in a manner similar to that described above for the first embodiment.

The actuator 612 has an integrated accumulator 678 that is partially filled with oil with the remaining volume filled with gas. An integrated check valve arrangement 614 is provided in the form of a cartridge valve 614b and a check valve 614a, although such are not required. The check valve arrangement 614 operates similarly as described in the earlier embodiments. The check valve 614a opens to allow fluid to move between the interior of a cylinder 618 and the integrated accumulator 678 to return a rod 620 and a piston 635 to the neutral position as shown when the check valve arrangement 614 is de-energized.

The actuator 612 includes the cylinder 618. The cylinder 618 has a first end wall 618a, a second end wall 618b, and a cylindrical wall 618c extending between the first end wall 618a and the second end wall 618b. The cylindrical wall 618c has an internal surface defining a bore 613. The bore 613 is stepped to form a shoulder 613a. There is an axial opening 622 formed through the first end wall 618a. The second end wall 618b is preferably adapted to be connected to one of the sprung portion and the unsprung portion of the vehicle.

The cylinder 618 has a first radial port 654. The first port 654 is formed radially through the cylindrical wall 618c adjacent the first end wall 618a. The cylinder 618 has a second radial port 652. The second port 652 is formed radially through the second end wall 618b. The purpose of the ports 652 and 654 will be further discussed below.

The cylinder 618 has a first groove 626a formed on the internal surface of the axial opening 622 in the end wall 618a adjacent the exterior of the cylinder 618 for receiving a first seal 626. The cylinder 618 has a second groove 643a formed on the internal surface of the axial opening 622 in the end wall 618a, adjacent the interior of the cylinder 618, for receiving a second seal 643.

The cup-shaped piston 635 is disposed within the cylinder 618. The piston has a first end 635a and a second end 635b. The first end 635a of the piston 635 is an open end and faces the first end 618a of the cylinder 618. The second end 635b of the piston 635 is a closed end and faces the second end 618b of the cylinder 618. The piston 635 includes an annular flange 637 proximate the first end 635a. The flange 637 extends radially inwardly. The purpose of the flange 637 will be discussed below. The piston 635 also includes an outwardly extending flange 637a, proximate the first end 635 of the piston 635. The flange 637a abuts the shoulder 613a of the cylinder wall 618c when the piston 635 is in the illustrated neutral position thereof. The piston 635 sealingly engages the cylindrical wall 618c. Preferably, a seal 613b is provided to seal the piston 635 to the cylindrical wall 618c.

The rod 620 extends through the axial opening 622 in the cylinder 618 into the interior of the cylinder 618 and through the open first end 635a of the piston 635. The rod 620 is mounted on the cylinder 618 for reciprocal movement therewith. The seal 626 disposed within the axial opening 622 provides a sliding fluid tight seal between the rod 620 and the cylinder 618. Note that, unlike the rod 120 of the first embodiment, the rod 620 does not extend through a second opening in the cylinder 618; accordingly some differences in operation (described below) will be required.

On the end of the rod 620 disposed within the piston 635, the rod 620 includes a circumferentially extending flange 621 that extends outwardly into the interior of the piston 635. The annular flange 637 of the piston 635 and the flange 621 of the rod 620 cooperate to retain the flange 621 and the rod 620 within the piston 635.

The second seal 643, the end walls 618a and 618b, the cylindrical wall 618c, the piston 635, the check valve 614a, the flange 621, the rod 620, and the cylinder 618 cooperate to define a first variable volume fluid chamber 654a within the cylinder 618. The first fluid chamber 654a is in fluid communication with the first port 654. The first fluid chamber 654a is in fluid communication with the interior of the piston 635, which forms a portion of the first fluid chamber 654a. A third fluid chamber 652a is formed in the end wall 618b, and is in direct fluid communication with the accumulator 678, and is in fluid communication with the inlet of the check valve 614 via a first port 678a so that the accumulator 678 can supply fluid to the variable volume fluid chamber 654a when the check valve 614 is open.

The roll control system 610 includes the integrated accumulator 678. The accumulator 678 includes the first port 678a. The accumulator also includes a second port 678b, the purpose of which will be described below. It will be appreciated that any accumulator suitable for the use described herein, and any of the accumulators shown or described herein may be used in any of the embodiments of the invention.

The first port 654 of the cylinder 618 is in fluid communication with a hydraulic line 660. The hydraulic line 660 is in fluid communication with the second port 652. The second port 652 of the cylinder 618 is in selective communication with the second port 678b of the accumulation 678 via the cartridge valve 614b.

While the hydraulic line 660 has been shown as being external to the cylinder 618, it must be understood however that the hydraulic line 660 may be internal to the cylinder 318. For example, the hydraulic line 660 may be formed in the cylindrical wall 618c.

The check valve arrangement 614 is illustrated in the deenergized "check" position of each of the valves 614a and 614b, only allowing flow from the accumulator 678 to the first chamber 654a. When the valve 614b is energized, the check valve arrangement 614 is said to be in the energized, flow-through, or open position, in which fluid can flow not only into the first chamber 654a from the check valve arrangement 614, but also out of the first chamber 654a through the valve 614b of the check valve arrangement 614 into the accumulator 678. The check valve arrangement 614 performs the same general function of the check valve arrangement 114.

The fluid in the first chamber 654a is kept under some pressure by the accumulator 678. More specifically, the pressure in the chamber 654a and the force of a spring 649 (disposed about the rod 620 and compressed between the first end wall 618a and the flange 637) act on the piston 635 to urge the piston 635 toward the second end wall 618b. The pressure in the chamber 654a acts on the piston 635 to urge the flange 621 of the rod 618 toward the first end wall 618a. During operation, as will be described below, the actuator 612 may be subjected to tensile forces sufficient that the force due to this differential pressure is overcome and the rod 620 may pull the piston 635 away from the second end wall 618b (and out of engagement with the shoulder 613a) or may be subjected to compressive forces urging the rod 620 further into the cylinder 635, and pushing the flange 621 away from the first end wall 618a.

As illustrated in FIGS. 9 and 10, the rod 620 and the piston 635 are in the neutral position relative to the cylinder 618. When the check valve arrangement 614 is energized, the rod 620 and the piston 635 may freely reciprocate within the cylinder 618 as needed. The movement of the rod 620 and the piston 635 into an elongated position will displace fluid from the first chamber 654a as the piston 635 is moved toward the first end wall 618a of the cylinder 618. Conversely, The movement of the rod 620 and the piston 635 into a compressed position will displace fluid from the interior of the piston 635 as more of the rod 620 is moved into the interior of the piston 635. The displaced fluid is stored in the accumulator 678. As the actuator 612 is elongated from a compressed position to the neutral position, and less of the rod 620 is disposed in the interior of the piston 635, fluid from the accumulator 678 will be drawn through the open check valve arrangement 614 into the interior of the piston 635, until the rod 620 moves to the illustrated neutral position and the flange 621 contacts the flange 637 of the piston 635, and starts to move the piston 635 away from the second end wall 618b, and out of the neutral position. Once that occurs, fluid will be displaced from the first chamber 654a into the accumulator 678 (the diameter of the piston 635 being greater than that of the rod 620 being withdrawn from the chamber 654a).

When the check valve arrangement 614 is de-energized, e.g., the roll control system 610 is engaged, fluid cannot exit the first chamber 654a through the first port 654, and fluid cannot exit the interior of the piston 635 via the check valve 614a and thus the rod 620 and piston 635 are locked relative to the cylinder 618 such that the rod 620 cannot extend further into the piston 635. The piston 635 cannot move lower into the first chamber 654a than the neutral position thereof because of the abutment of the flange 637a against the shoulder 613a. However, fluid may flow from the accumulator 678 into the first chamber 654a and the interior of the piston 635, if the fluid pressure within the accumulator 678 is greater than the fluid pressure within the first chamber 654a. Thus, the rod 620 and the piston 635 will be allowed to return to the neutral position if either is not in the neutral position when the check valve arrangement 614 is de-energized.

Similar to the operation described above in regard to the second embodiment, because a varying portion of the rod 620 may extend into the cylinder 618, the volume within the cylinder 618 occupied by the rod 620 varies. Therefore, the accumulator 678 must compensate not only for change in fluid pressure due to the loss in fluid due to leakage from the system 610, but also the potential change in volume within the system 610 due to the movement of a portion of the rod 620 in and out of the closed system of the cylinder 618 of the system 610. The volume of gas in the accumulator 678 allows the system 610 to compensate for this change in pressure and/or volume.

As described above, if the pressure within the accumulator 678 is higher than that of the pressure within the first chamber 654a or the interior of the piston 635, fluid from the accumulator 678 may feed into the first chamber 654a or the interior of the piston 635 through the check valve arrangement 614, even when the check valve arrangement 614 is de-energized.

As the vehicle on which the system 610 travels, the actuator 612 of the roll control system 610 will be occasionally subjected to forces tending to compress the actuator 612, and will be subjected to forces tending to elongate the actuator 612. With the check valve arrangement 614 energized, fluid is free to flow in either direction through the check valve arrangement 614 (via the valve 614b), and thus can freely flow into and out of the first chamber 645a and interior of the piston 635. This means that the actuator 612 is relatively free to elongate and to be compressed, allowing the suspension of the vehicle to absorb these forces to give a smoother ride. This would normally be the case when driving straight along relatively smooth roads. However, when conditions exist in which it would be desirable to enhance roll control, the check valve arrangement 614 can be deenergized.

If the check valve arrangement 614 is deenergized when the actuator 612 is in the neutral position thereof (as illustrated in FIG. 9), the rod 620 and the cylinder 618 are hydraulically locked in position relative to one another, and will not move from the neutral position. If the actuator 612 is subjected to compressive forces during this "locked in neutral" condition, fluid within the first chamber 654a is prevented from flowing out of the first port 654 and fluid within the interior of the piston 635 is prevented from flowing out of the check valve 614a, because the check valve arrangement 614 is blocking such flow. The piston 635 is already against the second end wall 618b of the cylinder 618. Thus, the rod 620 cannot move from the neutral position relative to the cylinder 618 to allow the actuator 612 to compress. Similarly, if the actuator 612 is subjected to forces tending to elongate the actuator 612 during this "locked in neutral" condition, fluid within the first chamber 654a is prevented from flowing out of the first port 654 and fluid within the interior of the piston 635 is prevented from flowing out of the check valve 614a, because the check valve arrangement 614 is blocking such flow. Thus, the rod 620 cannot move from the neutral position relative to the cylinder 618 to allow the actuator 612 to elongate.

If the check valve arrangement 614 is deenergized when the actuator 612 is in a compressed position thereof, the actuator 612 will be prevented from moving toward a more compressed position thereof (if additional compressive force acts on the actuator 612). Just as in the case discussed in the preceding paragraph, if the actuator 612 is subjected to additional compressive forces while in this "locked when compressed" condition, fluid within the first chamber 654a is prevented from flowing out of the first port 654 and fluid within the interior of the piston 635 is prevented from flowing out of the check valve 614a, because the check valve arrangement 614 is blocking such flow. Thus, the rod 620 cannot move from the compressed position relative to the cylinder 618 that was existent when the check valve arrangement 614 was shut, toward a more compressed position of the actuator 612.

However, when the actuator 612 in this compressed position and is subjected to forces tending to elongate the actuator 612, the actuator 612 is free to move toward the neutral position thereof. As the rod 620 is moved by these elongating forces, the interior of the piston 635 increases in volume, lowering the pressure of the fluid within the volume. Until the actuator 612 reaches the neutral position (or the check valve arrangement 614 is re-energized), fluid is free to flow into the interior of the piston 635 via the check valve 614a of the check valve arrangement 614 from the accumulator 678, to fill the expanding interior of the piston 635. However, once the rod 620 has moved to the neutral position, further movement would cause the piston 635 to move away from the second end wall 618b, which would tend to displace fluid from the first chamber 654a, as described above. Thus, further movement tending to cause the actuator 612 to move to an extended position is prevented by the check valve arrangement 614 as described above.

Similarly, if the check valve arrangement 614 is deenergized when the actuator 612 is in an elongated position thereof, the actuator 612 will be prevented from moving toward a more elongated position thereof (if additional tensile force acts on the actuator 612). As was discussed above, if the actuator 612 is subjected to additional tensile forces while in this "locked when elongated" condition, fluid within the first chamber 654a is prevented from flowing out of the first port 654 and fluid within the interior of the piston 635 is prevented from flowing out of the check valve 614a, because the check valve arrangement 614 is blocking such flow. Thus, the rod 620 cannot move from the elongated position relative to the cylinder 618 that was existent when the check valve arrangement 614 was shut, toward a more elongated position of the actuator 612.

However, when the actuator 612 in this elongated position and is subjected to forces tending to compress the actuator 612, the actuator 612 is free to move toward the neutral position thereof. As the rod 620 and the piston 635 are moved by these compressive forces, the first chamber 654a increases in volume, decreasing the pressure of the fluid within the volume. Until the actuator 612 reaches the neutral position (or the check valve arrangement 614 is re-energized), fluid is free to flow into of the first chamber 654a via the first port 654 and the check valve arrangement 614 from the accumulator 678. However, as the rod 620 moves the rod 620 will not travel further inside the piston 635, as described above, and therefore further movement causing the actuator 612 to move to a compressed position is prevented by the check valve arrangement 614 as described above, since further compressive movement of the rod 620 would require fluid to flow out of the interior of the piston 635 via the check valve 614a of the deenergized check valve arrangement 614.

It will be appreciated that the third, fourth, fifth, and sixth embodiments operate optimally when the respective piston is drivingly connected to the suspension arm of the vehicle and the respective cylinder is connected to the anti-roll bar of the vehicle.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A hydraulically operated actuator for controlling the roll of a motor vehicle, wherein the actuator is connected between an unsprung portion of the vehicle and a sprung portion of the vehicle for selectively coupling the sprung portion of the vehicle to the unsprung portion of the vehicle, the actuator comprising;
    a rod adapted to be fixed to one of the sprung portion of the vehicle and the unsprung portion of the vehicle;
    a flange formed on said rod;
    a cylinder adapted to be fixed to the other of the sprung portion of the vehicle and the unsprung portion of the vehicle, wherein said cylinder has an internal surface defining a bore and at least first and second ports, wherein said flange is disposed in said bore of said cylinder between said first and second ports and wherein said cylinder includes at least one seal engaging said internal surface of said cylinder between said first and second ports, wherein at least one of said first and second ports is connected to a fluid conduit that is external to said bore;
    a piston disposed within said bore of said cylinder, said piston having an open end for receiving said flange of said rod therein to thereby assist in retaining said flange and said rod within said piston; and
    a check valve arrangement and an accumulator both disposed within said cylinder, wherein said check valve arrangement is operative to open to allow fluid to move between said bore of said cylinder and said accumulator to return said rod and said piston to a neutral position when said check valve arrangement is de-energized.

2. The actuator of claim 1 wherein said cylinder is fixed to the unsprung portion of the vehicle.

3. The actuator of claim 1 wherein said check valve arrangement comprises a solenoid.

4. The actuator of claim 3 wherein said solenoid is configured such that when said solenoid is energized said check valve arrangement moves from the open position to the closed position.

5. The actuator of claim 3 wherein said solenoid is configured such that when said solenoid is energized said check valve arrangement moves from the closed position to the open position.

6. The actuator of claim 1 wherein the neutral position is a center position.

* * * * *

UNITED STATES PATENT AND TRADEMARK OFFICE
CERTIFICATE OF CORRECTION

PATENT NO. : 7,641,208 B1
APPLICATION NO. : 10/892784
DATED : January 5, 2010
INVENTOR(S) : Barron et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1140 days.

Signed and Sealed this

Sixteenth Day of November, 2010

David J. Kappos
*Director of the United States Patent and Trademark Office*